United States Patent [19]

Okumura et al.

[11] Patent Number: 5,300,850

[45] Date of Patent: Apr. 5, 1994

[54] VIBRATION WAVE MOTOR

[75] Inventors: Ichiro Okumura; Hitoshi Mukohjima, both of Yokohama; Takayuki Tsukimoto; Akio Atsuta, both of Kawasaki; Koichi Ueda, Yokohama; Hajime Kanazawa, Tama, all of Japan

[73] Assignee: Canon Kabushiki Kaisha, Tokyo, Japan

[21] Appl. No.: 827,866

[22] Filed: Jan. 30, 1992

Related U.S. Application Data

[63] Continuation of Ser. No. 480,201, Feb. 14, 1990, abandoned.

[30] Foreign Application Priority Data

| Feb. 14, 1989 | [JP] | Japan | 1-35348 |
| Feb. 17, 1989 | [JP] | Japan | 1-37420 |
| Apr. 19, 1989 | [JP] | Japan | 1-99845 |
| Apr. 20, 1989 | [JP] | Japan | 1-101467 |
| Aug. 4, 1989 | [JP] | Japan | 1-202361 |
| Oct. 30, 1989 | [JP] | Japan | 1-282209 |
| Dec. 29, 1989 | [JP] | Japan | 1-343131 |

[51] Int. Cl.$^5$ .............................................. H01L 41/08
[52] U.S. Cl. ..................................................... 310/323
[58] Field of Search .......................... 310/323, 328, 51

[56] References Cited

U.S. PATENT DOCUMENTS

| 4,580,073 | 4/1986 | Okumura et al. | 310/323 |
| 4,634,915 | 1/1987 | Mukohjima et al. | 310/323 |
| 4,649,311 | 3/1987 | Mukohjima et al. | 310/323 |
| 4,692,651 | 9/1987 | Hiramatsu et al. | 310/323 |
| 4,771,203 | 9/1988 | Mukohjima et al. | 310/328 X |
| 4,829,209 | 5/1989 | Kawasaki et al. | 310/328 X |
| 4,882,500 | 11/1989 | Iijima | 310/328 X |
| 5,099,166 | 3/1992 | Hirano et al. | 310/323 |
| 5,157,300 | 10/1992 | Kataoka et al. | 310/323 |

FOREIGN PATENT DOCUMENTS

| 3626389A1 | 2/1987 | Fed. Rep. of Germany . | |
| 0204480 | 11/1984 | Japan | 310/323 |
| 0135369 | 6/1986 | Japan | 310/323 |
| 0147974 | 7/1987 | Japan | 310/323 |
| 0011073 | 1/1988 | Japan | 310/323 |

*Primary Examiner*—Mark O. Budd
*Attorney, Agent, or Firm*—Fitzpatrick, Cella, Harper & Scinto

[57] ABSTRACT

A vibration wave device having a resilient member, and electro-mechanical energy conversion means for inducing a travelling vibration wave in the resilient member, the travelling vibration wave being used as a drive source, includes means provided on at least one member of the vibration wave device at a location integer times or approximately integer times ½ of the wavelength of a vibration wave which may produce noise and making the dynamic rigidity of the member non-uniform.

25 Claims, 23 Drawing Sheets

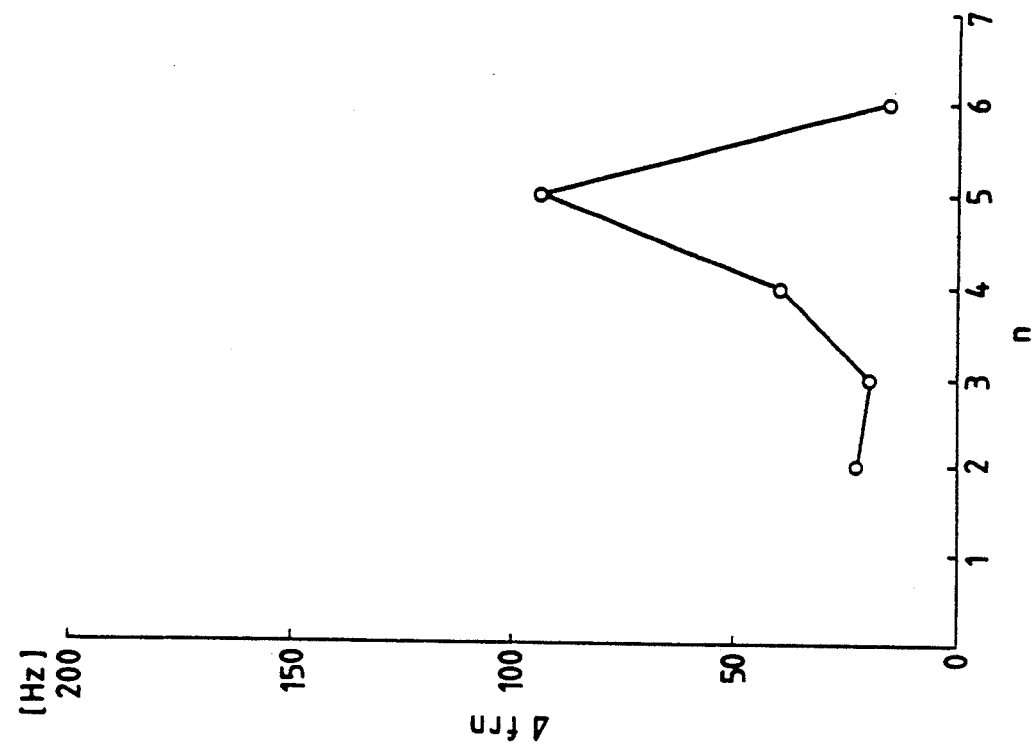
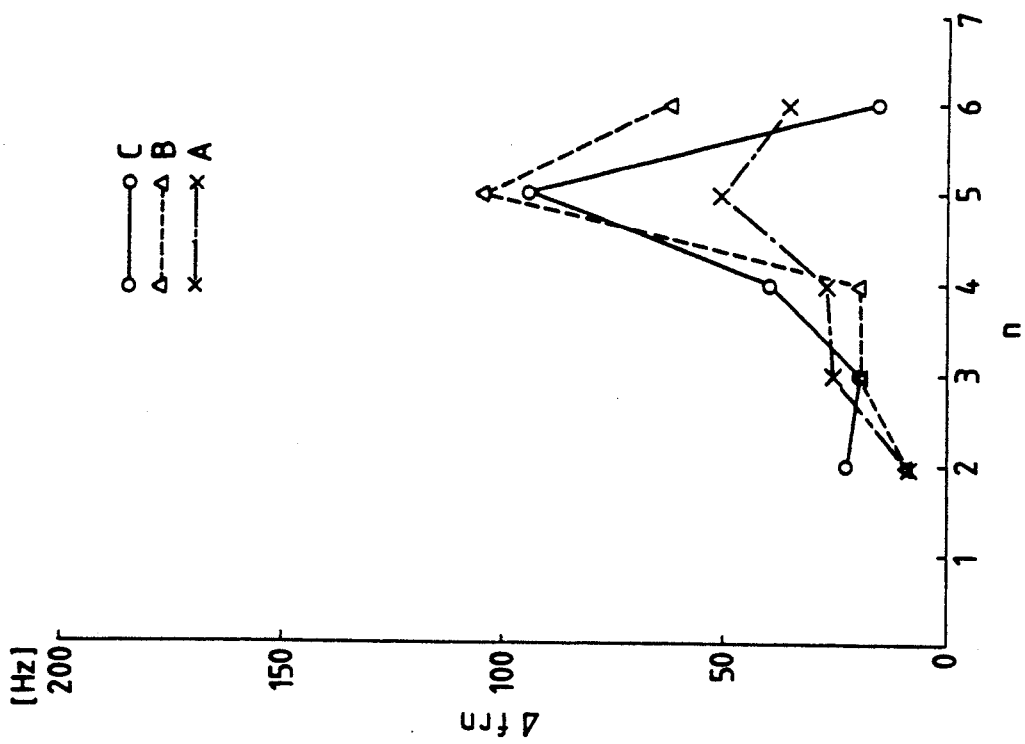

COS MODE

SIN MODE

SIN MODE

COS MODE

VIBRATION WAVE MOTOR

This application is a continuation of application Ser. No. 07/480,201 filed Feb. 14, 1990, now abandoned.

BACKGROUND OF THE INVENTION

1. Field of the Invention

This invention relates to a vibration wave device, and particularly to the structure of a vibration member in a travelling wave type vibration wave motor.

2. Related Backgorund Art

A vibration wave motor in which a travelling vibration wave is engendered in a resilient member and a moving member such as a rotor is moved by this vibration is compact and can provide for a high torque during a low speed and therefore has been adopted for driving the photo-taking lens of a single-lens reflex camera in recent years.

FIG. 2 of the accompanying drawings is a longitudinal cross-sectional view of the photo-taking lens of a single-lens reflex camera incorporating therein a vibration wave motor for driving the photo-taking lens. The reference numeral 1 designates a circular ring-like metallic resilient member rotatable about the optic axis L of the photo-taking lens. As shown in FIG. 3 of the accompanying drawings, grooves 1A of a predetermined width t and a predetermined depth h are formed on that side of the resilient member 1 which is in contact with a rotor 3 to be described, over the entire periphery thereof. A piezo-electric element 2 such as PZT is fixed to the lower portion of the resilient member 1 by an adhesive agent. Ultrasonic driving signals of different phases are applied to the piezo-electric element 2 as an electro-mechanical energy conversion element by a conventional method, and the resilient member 1 is vibrated in response to these signals, whereby there is engendered a travelling vibration wave rotating in the circumferential direction of the resilient member 1 which forms a vibration member. The reference numeral 3 denotes a circular ring-like rotor having an end portion which is in pressure contact with the upper surface of the resilient member 1. A circular ring-like first vibration absorbing member 5 formed by rubber or like material is provided on the other end of the rotor 3 as a moving member. The reference numeral 4 designates a circular ring-like vibration insulating member formed of felt or like material. The insulating member 4 is subjected to a pressure force from two counter-sunk springs 9 superposed one upon the other with a felt bed 8 interposed therebetween.

The rotor 3 is held in close contact with a connecting plate with the aforementioned first vibration absorbing member 5 interposed therebetween. The circular ring-like connecting plate 22 is fixed to an output transmitting member 25 by six fastening screws (not shown). The output transmitting member 25 rotatable about the optic axis L constitutes a ball bearing by the use of balls 10 and ball races 13 and 14. The ball races 13 and 14 are fixed to the outer cylinder 12 of the photo-taking lens, and the outer cylinder 12 is coupled to a fixed cylinder 11 and fixed to a camera mount 19. A connecting roller 15 is fixed to the fore end of the output transmitting member 25, and is engaged with the key way (not shown) of a moving ring 17 holding a focusing lens 27 provided in the direction of the optic axis. The threaded portion 18a of a fixed inner cylinder 18 and the threaded portion 17a of the moving ring 17 are helicoid-coupled together, and by the rotational movement of the output transmitting member 25, the moving ring is movable in the direction of the optic axis while being rotated through the intermediary of the connecting roller 15.

In such a construction, a travelling vibration wave is engendered in the vibration members 1 and 2 in a conventional manner by an AF singal from the camera side or a driving signal from a manual ring 16 to thereby rotate the rotor 3 and finally move the focusing lens 27 in the direction of the optic axis, thus accomplishing focus adjustment.

In the case of such a conventional device, the vibration members 1 and 2 have been formed of a uniform material so that the travelling vibration wave for driving may be of the same amplitude and the same wavelength at any position on the vibration members, and have been of substantially uniform structure as shown in FIG. 3 of the accompanying drawings.

In the above-described conventional device, however, the error of the degree of planarity of the vibration member, the moving member or the holding member therefor has caused the irregularity of surface pressure in the surface of contact between the two (the vibration member and the moving member), and due to such a cause, a travelling vibration wave of a wavelength differing from that of the travelling vibration wave for driving has grown and thus, noise has sometimes occurred from the surface of contact between the vibration member and the moving member.

When such travelling vibration wave having a wavelength causing the production of noise has been analyzed, it has been found that in one case, this travelling vibration wave is of a single wavelength and in another case, it is of a plurality of wavelengths.

SUMMARY OF THE INVENTION

One aspect of the application is to provide a vibration wave device in which the occurrence of noise is suppressed and to provide, at a position substantially integer times ½ of the wavelength of a vibration wave which may cause the occurrence of noise in at least one member of the vibration wave device such as, for example, a resilient member or a vibration insulating member, means such as grooves, holes or projections for making the dynamic rigidity of said member non-uniform to thereby preclude said unnecessary vibration wave from growing into a travelling wave.

One aspect of the application is to provide a vibration wave device in which even if there is the possibility that a travelling vibration wave having a plurality of kinds of wavelengths may cause the occurrence of noise, such noise can be prevented or suppressed, and to provide a motor in which at a location on one member of the vibration wave device and integer times or approximately integer times ½ of the wavelengths of the plurality of vibration waves which may cause the occurrence of noise, there is provided means for making the dynamic rigidity of said member non-uniform.

One aspect of the application is to provide a vibration wave motor in which an AC voltage is applied to electro-mechanical energy converting means for driving to thereby excite a plurality of standing waves having deviation in positional phase therebetween in a resilient member and form a travelling vibration wave in said resilient member, thereby moving said resilient member and a pressing member which is in pressure contact with said resilient member relative to each other, and wherein a portion of non-uniform dynamic rigidity is provided on at least one of motor constituting members including said resilient member and said pressing member which affect the formation of a travelling vibration wave so that the difference between the natural frequencies of the plurality of standing waves of a driving mode excited in said resilient member may be smaller than the difference between the frequencies of a plurality of standing waves in at least one other vibration mode than the travelling vibration wave for driving.

One aspect of the application is to provide a vibration wave motor in which an AC voltage is applied to electro-mechanical energy converting means for driving having a predetermined positional phase difference therebetween to thereby form a travelling vibration wave in a resilient member and move said resilient member and a pressing member which is in pressure contact with said resilient member relative to each other, and wherein a portion of non-uniform dynamic rigidity is provided on one of said resilient member and a support member therefor so that the difference between the natural frequencies of standing waves of the driving mode excited in said resilient member may be smaller than the difference between the frequencies of standing waves in at least one other vibration mode than the travelling vibration wave for driving and the portions of non-uniform dynamic rigidity for said electro-mechanical energy converting means for driving are made equal or approximate to each other.

One aspect of the application is to make, in a vibration wave motor provided with a resilient member and vibration driving means comprising an electro-mechanical energy converting element and producing a travelling vibration wave in said resilient member by the application of an AC voltage thereto, a construction in which at a location spaced by integer times ½ of the wavelength λ of unnecessary vibration supposed to occur on said resilient member, a portion of non-uniform resistance to the deformation of the resilient member is provided along the direction of travel of said vibration wave and a portion of non-uniform resistance to said resistance is provided in the range of $(2k+1)\lambda/4$ [k being 0 or a positive integer] about said position.

One aspect of the application is to provide a vibration wave device in which even if there is the possibility that a travelling vibration wave having a plurality of kinds of wavelengths may cause the occurrence of noise, such noise can be prevented or suppressed, and in which in order to solve such a task, at a location integer times or approximately integer times ½ of the wavelength λ of a plurality of vibration waves which may cause the occurrence of noise on a different constituents of the vibration wave device, there is provided means for making the dynamic rigidity of said member non-uniform.

By the way, if a resilient member in a vibration wave motor is a perfectly circular ring or a circular plate having uniform dynamic ridigity, the standing wave mode for driving will recede and the natural frequency by the driving of one group of piezo-electric elements for driving (hereinafter referred to as the Sin mode) and the natural frequency by the driving of the other group piezo-electric elements (hereinafter referred to as the Cos mode) will coincide with each other.

However, due to holes, projections and the like for fixing the resilient member to a fixed member or the like being present in the resilient member and due to the difference in dynamic rigidity between the linear portion and arcuate portion of the resilient member when the resilient member is of an elliptical shape, there is provided a difference between the natural frequencies of one standing wave and the other standing wave in the unnecessary mode to make it difficult for flutter vibration (which is caused chiefly by an in-surface or out-of-surface elastic travelling wave of lower order than the driving wave being engendered) to occur and therefore, in some cases, deviation has occurred between the natural frequencies in the Sin mode and the Cos mode which are vibration modes for driving, due to the presence of a portion of non-uniform dynamic rigidity provided, for example, on the resilient member. As a result, when it is desired to obtain a travelling wave by adding two standing waves to each other, the vibration amplitudes of the two standing waves differ from each other unless there is effected complicated control of detecting the vibration amplitudes of the two standing waves, controlling the ratio of voltages applied to the two groups of piezo-electric elements for driving so that the two amplitudes may become equal to each other, and detecting the phase difference between the two vibration amplitudes and controlling the phase difference between the two applied voltages so as to be a prescribed phase difference, and the phase difference does not assume a prescribed value and therefore, the amplitude of the formed travelling wave varies with time and uniform contact cannot be kept with the pressed moving member and thus, the motor output is reduced.

One aspect of the application is to provide a vibration wave motor in which, in order to eliminate the above-noted problem, an AC electric field is applied to an electro-mechanical energy conversion element joined to a resilient member partly non-uniform in dynamic rigidity to thereby excite a plurality of standing waves in said resilient member and form an elastic travelling wave and a pressing member which is in pressure contact with said resilient member and said resilient member are moved relative to each other by friction therebetween and wherein a portion of non-uniform rigidity for regulation is provided in said resilient member so that the natural frequencies of the plurality of standing waves in the vibration mode used for driving may coincide with one another.

BRIEF DESCRIPTION OF THE DRAWINGS

FIG. 19 shows the difference in the natural frequency of the nth-order mode of the resilient member for each mode.

FIG. 22 shows the difference in the natural frequency of the nth-order mode of the resilient member for each mode.

DESCRIPTION OF THE PREFERRED EMBODIMENTS

Figure 1:
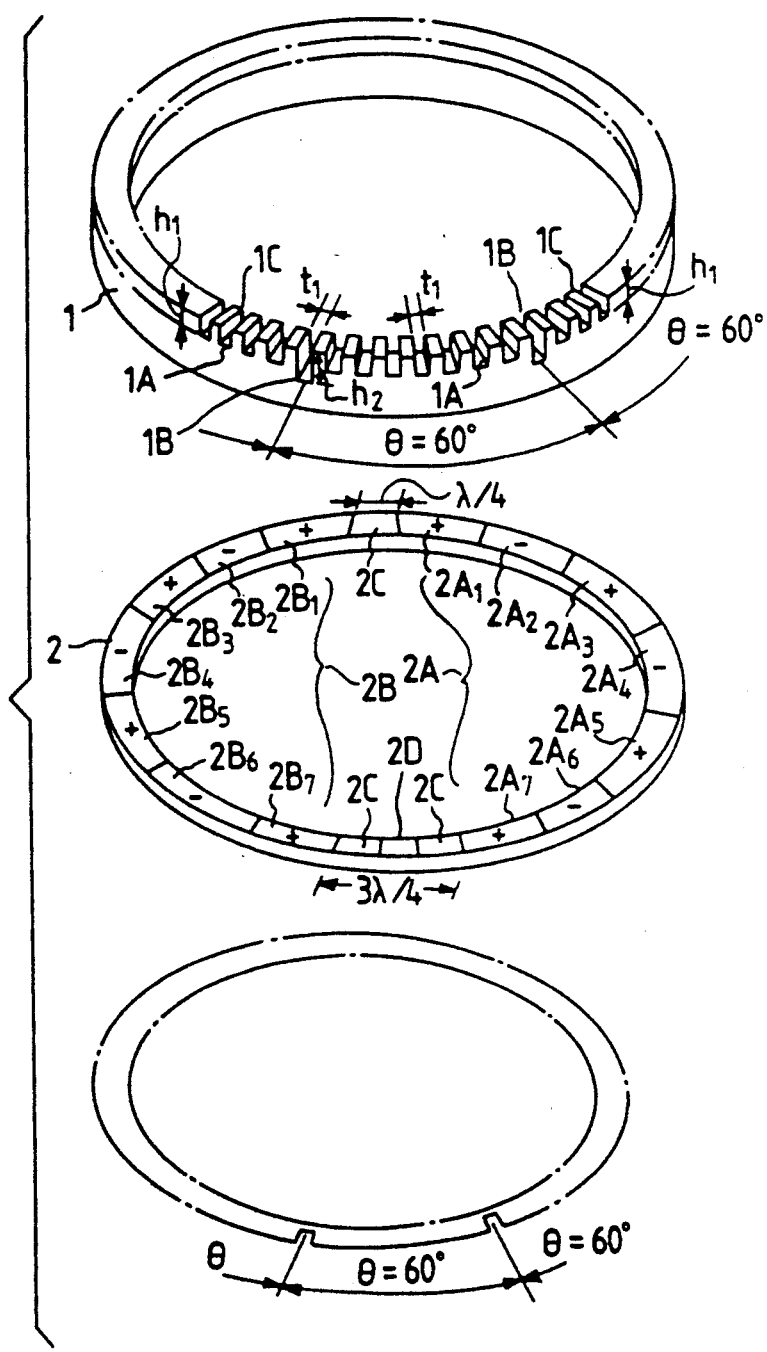
FIG. 1 is an exploded perspective view of the essential portions of a vibration wave motor in a photo-taking lens for a single-lens reflex camera to which the present invention is applied.

FIG. 1 is a perspective view of the essential portions of the resilient member 1 and the piezo-electric element 2 as the electro-mechanical energy conversion element of a vibration wave motor in a photo-taking lens for a single-lens reflex camera to which the present invention is applied. The photo-taking lens shown in FIG. 1 is substantially the same as the photo-taking lens shown in FIGS. 2 and 3 and therefore, only elements differing from those of the photo-taking lens shown in FIG. 2 will hereinafter be described and the other elements need not be described. In FIG. 1, the reference numeral 1 designates a circular ring-like resilient member forming the main constituent portion of the vibration wave motor. The resilient member 1 has a number of grooves 1A of width $t_1$ and depth $h_1$ formed in the surface of contact thereof with the rotor 3 (see FIG. 2) as a moving member over the full periphery thereof. Some of these grooves are deep grooves of depth $h_2$ as shown as 1B. When the number of the waves of vibration producing noise is e.g. three (hereinafter the flexural vibration when this number of waves are produced in the resilient member 1 will be referred to as the 3rd-order mode flexural vibration, and the flexural vibration when n waves are produced in the resilient member 1 will be referred to as the nth-order mode flexural vibration), six such deep grooves 1B are provided at an interval of pitch $\theta = 60°$. Also, when the number of the waves of flexural vibration producing noise is n, that is, in the case of the nth-order mode flexural vibration, these deep grooves 1B are provided on the resilient member 1 at an interval of pitch $$\theta = \frac{360°}{2n}.$$

The reference numeral 2 denotes a piezo-electric element such as PZT as an electro-mechanical energy conversion element. As in the prior-art device shown in FIG. 2, the piezo-electric element 2 is attached to one end surface of the resilient member 1 by an adhesive agent. Areas $2A_1-2A_7$ forming the A phase driving area of this piezo-electric element 2 and areas $2B_1-2B_7$ forming the B phase driving area of the piezo-electric element 2 are alternately polarized in different directions of polarization as shown in FIG. 1, and a common electrode 2C which is common to the A phase and B phase driving areas and connected to the earth of a drive source, not shown, is provided between the area $2A_1$ in the A phase driving area and the area $2B_1$ in the B phase driving area. The width of the areas $2A_1-2A_7$ and $2B_1-2B_7$ forming the A phase and B phase driving areas, respectively, is set to $\frac{1}{2}$ of the wavelength $\lambda$ of the flexural vibration of the resilient member 1, and further the sum of the widths of the common electrode 2C and sensor electrode 2D is set to the wavelength $\lambda$. Electrodes on the areas $2A_1-2A_7$ forming the A phase driving area which are provided on the side opposed to the common electrode 2C are connected to a first AC power source, not shown. Also, electrodes on the areas $2B_1-2B_7$ forming the B phase driving area which are provided on the side opposed to the common electrode 2C are connected to a second AC power source, not shown, which outputs an AC signal having a phase difference of 90° with respect to the output signal of the aforementioned AC power source. Respective ones of the A phase driving areas $2A_1-2A_7$ and respective ones of the B phase driving areas $2B_1-2B_7$ corresponding to respective ones of the areas $2A_1-2A_7$ are provided with a spacing of $\lambda/4$ therebetween.

The operation of the photo-taking lens of such construction will now be described. When AC signals are supplied from the first and second AC power sources to the A phase driving area and B phase driving area of the piezo-electric element 2, a travelling vibration wave comprising eight waves, in other words, an 8th-order mode travelling vibration wave, is generated in the resilient member 1 by the flexural vibration of the piezoelectric element 2, and the rotor 3 (see FIG. 2) is rotated about the optic axis L by this vibration wave. As a result, a focusing lens 27 is moved along the optic axis L, whereby the focusing operation is executed.

The foregoing description is the description of the operation when the vibration wave motor has operated normally, and description will hereinafter be made of the operation when the nth-order mode flexural vibration which may produce noise during the operation or from the start of the operation, for example, 3rd-order mode flexural vibration, is generated on the resilient member 1. In the case of a resilient member of non-uniform structure as shown in FIG. 1, the natural frequency of the resilient member 1 in the 3rd-order mode vibration wave having the deep grooves 1B as modes is high, while the natural frequency of the resilient member 1 in the 3rd-order mode vibration wave having the deep grooves 1B as loops is lower than the aforementioned natural frequency. Thus, the natural frequencies of the resilient member 1 at the respective positions of the 3rd-order mode vibration wave differ from each other and therefore, the 3rd-order mode vibration wave which may produce noise cannot become a travelling wave, and accordingly, even if the 3rd-order mode vibration wave is generated due to some cause or other, noise will not be produced thereby.

In the embodiment shown in FIG. 1, the deep grooves 1B for making the dynamic rigidity of the resilient member 1 partly non-uniform are provided at predetermined locations on the resilient member 1, i.e., locations corresponding to integer times ½ of the wavelength $\lambda$ of the 3rd-order mode vibration wave which may produce noise (hereinafter referred to as $\gamma\lambda/2$, $\gamma$ being an integer), but an effect similar to what has been previously described will be obtained even if the grooves at the locations of these deep grooves 1B are made shallow and the dynamic rigidity of the resilient member 1 is made partly non-uniform.

Figure 2:
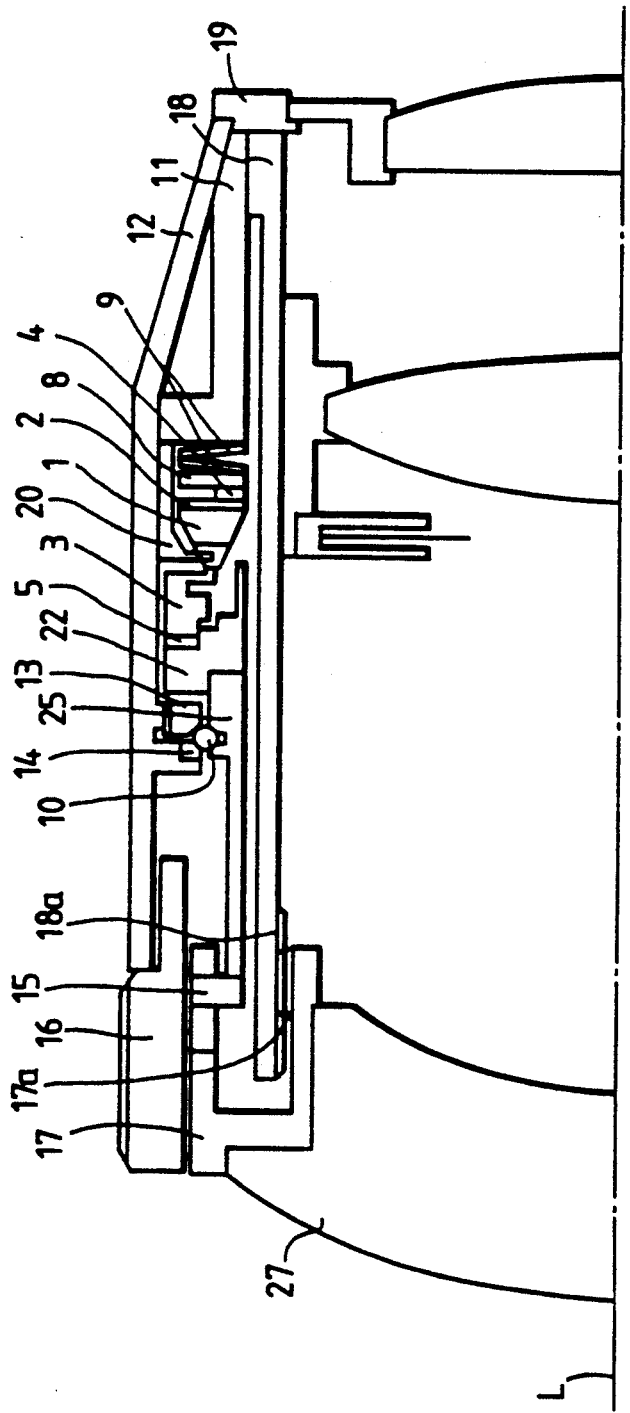
FIG. 2 is a longitudinal cross-sectional view of a photo-taking lens to which a conventional vibration wave motor is applied.
Figure 3:
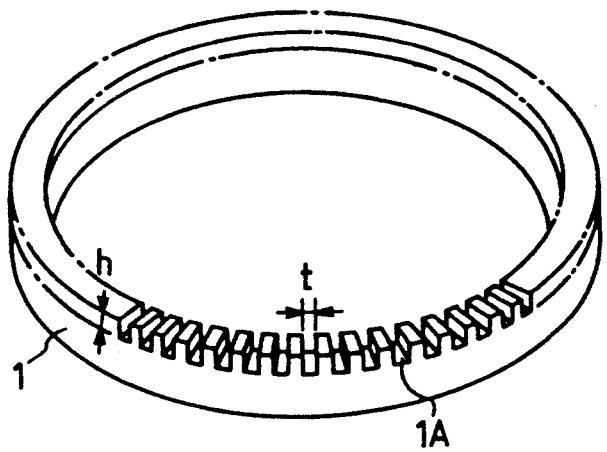
FIG. 3 is a perspective view of the essential portions of the vibration wave motor shown in FIG. 2.

Also, in the above-described embodiment, non-uniform portions are provided at locations on the resilient member 1 corresponding to $\gamma\lambda/2$ (or of course, approximately $\gamma\lambda/2$) of the wavelength $\lambda$ of the vibration wave which may produce noise (in the case of the nth-order mode vibration wave, locations on the resilient member 1 corresponding to $\gamma\lambda/2$ or approximately $\gamma\lambda/2$ of the wavelength $\lambda$ of the nth-order mode vibration wave), but the resilient member 1 may be a uniform resilient member as shown in FIG. 3 and at predetermined locations on the circular ring-like vibration insulating member 4 shown in FIG. 2, i.e., locations corresponding to $\gamma\lambda/2$ or approximately $\gamma\lambda/2$ of the wavelength $\lambda$ of a vibration wave which may produce noise, non-uniform portions may be provided by cut-aways (see FIG. 1), apertures or the like, and a similar countermeasure may be taken in the vibration absorbing member 5 and the output transmitting member 25 shown in FIG. 2. Saying in addition, the non-uniform portions as previously described can be provided at predetermined locations on a constituent of the vibration wave motor or a constituent of a device connected to the motor, i.e., locations corresponding to $\gamma\lambda/2$ or approximately $\gamma\lambda/2$ of the wavelength $\lambda$ of the vibration wave which may produce noise, thereby preventing noise.

Figure 4:
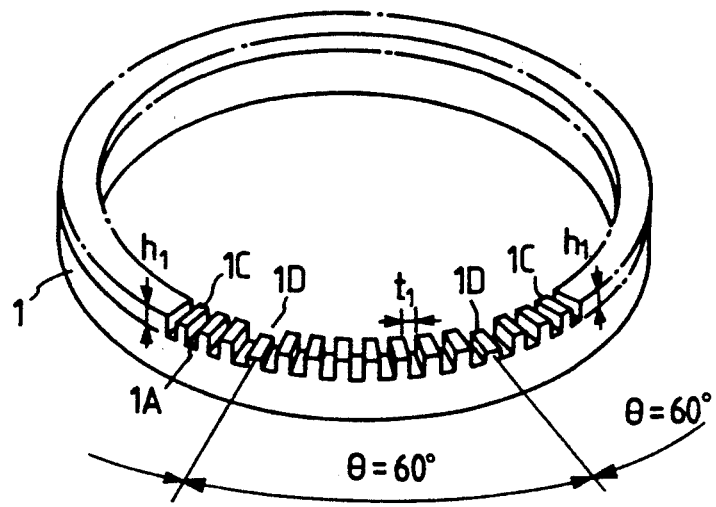
FIGS. 4 to 10 are perspective views of the essential portions of another embodiment of the vibration wave motor shown in FIG. 1 to which the present invention is applied.

FIG. 4 shows another embodiment of the resilient member 1 shown in FIG. 1, and this embodiment is one in which some of teeth 1C shown in the embodiment of FIG. 1 are provided by low teeth 1D to thereby form non-uniform portions in the resilient member 1.

Figure 5:
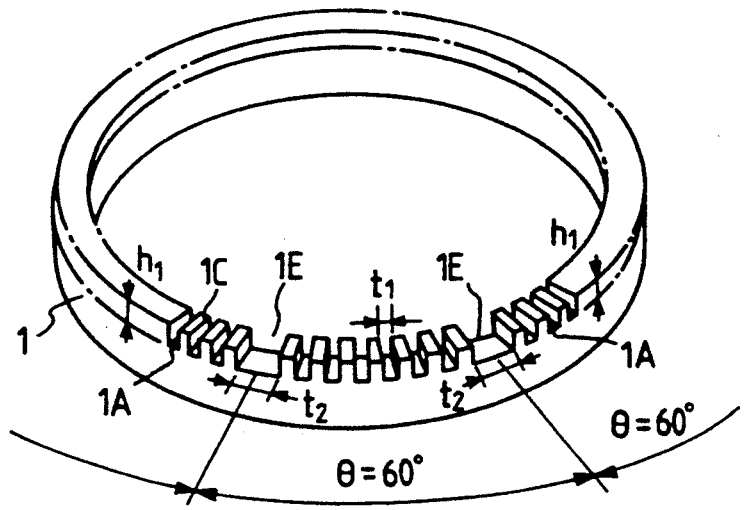

FIG. 5 shows still another embodiment of the resilient member 1 shown in FIG. 1, and this embodiment is one in which grooves 1E of width $t_2$ differing from the width $t_1$ of the grooves 1A shown in the embodiment of FIG. 1 are provided at locations corresponding to $\gamma\lambda/2$ of the wavelength $\lambda$ of the vibration wave which may produce noise, whereby non-uniform portions are formed in the resilient member 1. While in the embodiment shown in FIG. 5, the width of the grooves is made greater, a similar effect will be obtained even if the width of the grooves 1E is made smaller.

Figure 6:
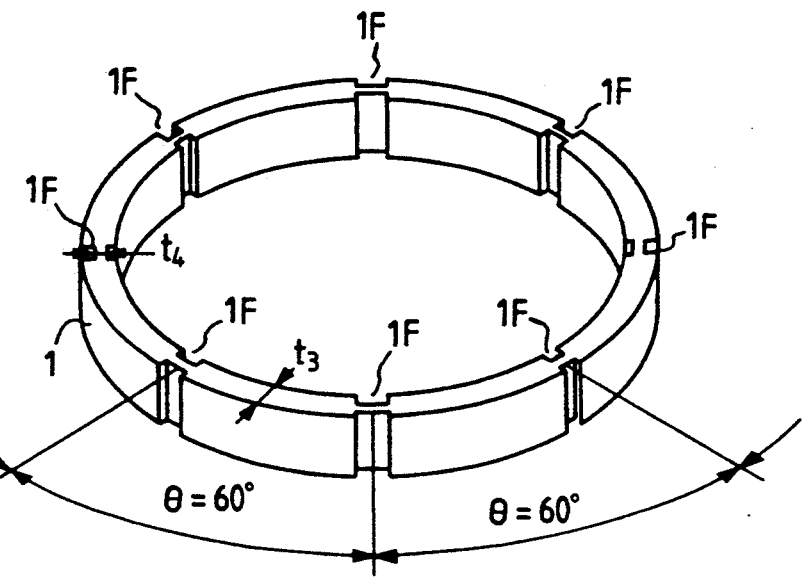

FIG. 6 shows another embodiment of the resilient member 1 shown in FIG. 1, and this embodiment is one in which the width of the resilient member 1 at locations corresponding to $\gamma\lambda/2$ of the wavelength $\lambda$ of the vibration wave which may produce noise is changed (in the present embodiment, narrowed), whereby non-uniform portions are provided in the resilient member 1. While vertical grooves 1F in FIG. 6 are formed by providing grooves in the inner and outer sides of the resilient member, these grooves 1F may be formed in one of the inner side and the outer side. Also, a similar effect may be obtianed if the material of the portions of the resilient member which correspond to the grooves 1F is made different from the material of the other portions.

Figure 7:
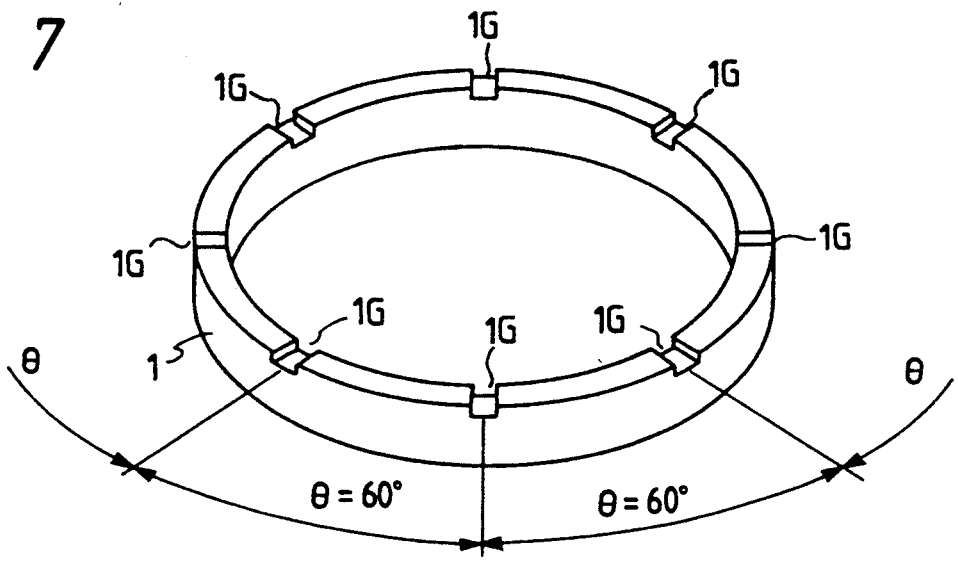

FIG. 7 shows another embodiment of the resilient member 1 shown in FIG. 1, and this embodiment is one in which grooves 1G are provided in the flat portions of the resilient member 1 which do not have the teeth 1C, i.e., at locations corresponding to $\gamma\lambda/2$ of the wavelength $\lambda$ of the vibration wave which may produce noise, whereby non-uniform portions are formed in the resilient member 1. Instead of the grooves 1G, these portions may be made higher than the other portion. In the case of the embodiment shown in FIG. 7, the grooves 1G are provided in the upper surface of the resilient member 1, but they may be provided in the lower surface of the resilient member 1 to thereby obtain a similar effect. Instead of providing such grooves in the resilient member 1, grooves (not shown) similar to the grooves 1G shown in FIG. 7 may be provided in the upper surface of the rotor 3.

Figure 8:
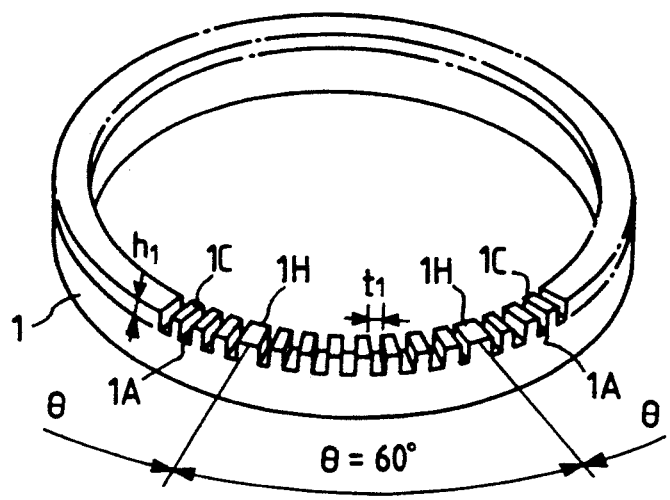

FIG. 8 shows another embodiment of the resilient member 1 shown in FIG. 1, and this embodiment is one in which, instead of the teeth 1D shown in FIG. 4, teeth 1H having a width greater than that of the teeth 1D are provided.

Figure 9:
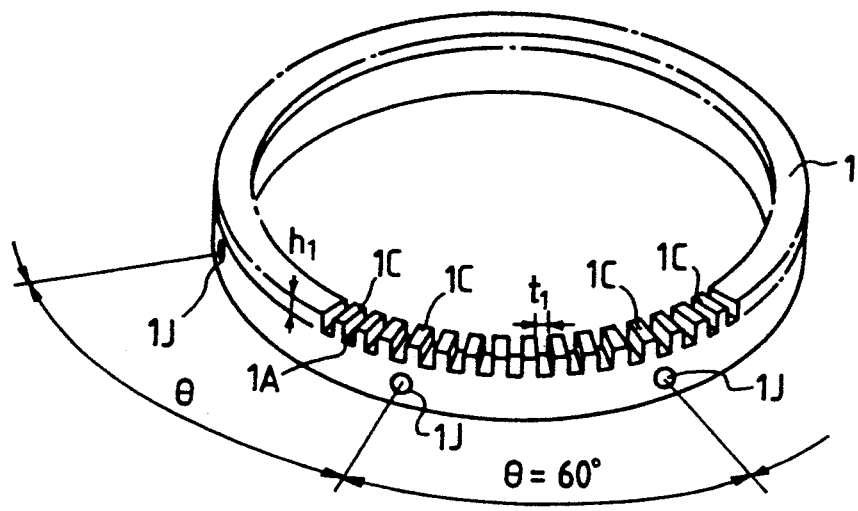
Figure 10:
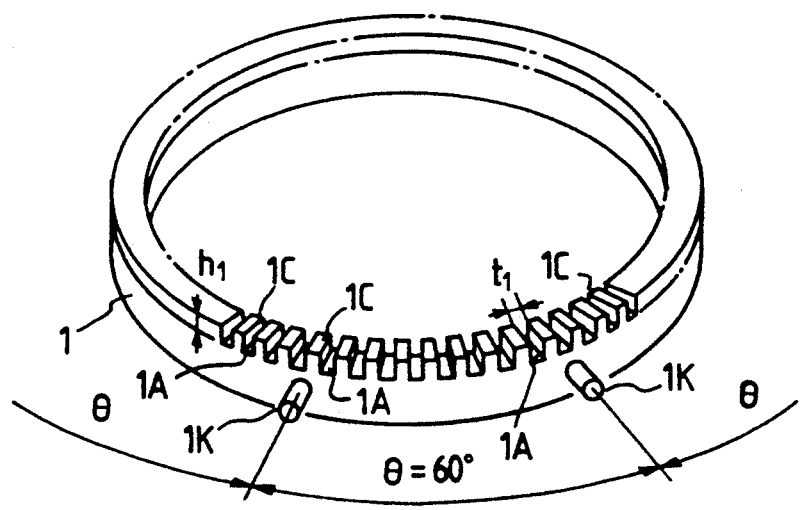

FIG. 9 shows still another embodiment of the resilient member 1 shown in FIG. 1, and this embodiment is one in which, instead of the grooves 1B shown in FIG. 1, holes 1J of a predetermined depth are provided at the locations corresponding to the grooves 1B, and FIG. 10 shows an embodiment in which, instead of the holes 1J, projections are secured to the resilient member 1 to thereby provide non-uniform portions on the resilient member 1.

While the above-described embodiments are circular ring-like vibration wave motors, the present invention can be applied not only to such vibration wave motors, but also to a vibration wave motor in which the resilient member is of a disk-like shape or an elliptical shape, as well as to a vibration wave motor of the type in which the resilient member itself is moved by a travelling vibration wave.

As described above, in each of the foregoing embodiments, at locations on at least one member of the vibration wave device such as the resilient member, the vibration insulating member or the output transmitting member which are integer times or approximately integer times $\frac{1}{4}$ of the wavelength $\lambda$ of the vibration wave which may produce noise, there are provided means such as grooves, projections or holes which make that member non-uniform and therefore, the noise which has heretofore posed a serious problem can be suppressed.

Figure 11:
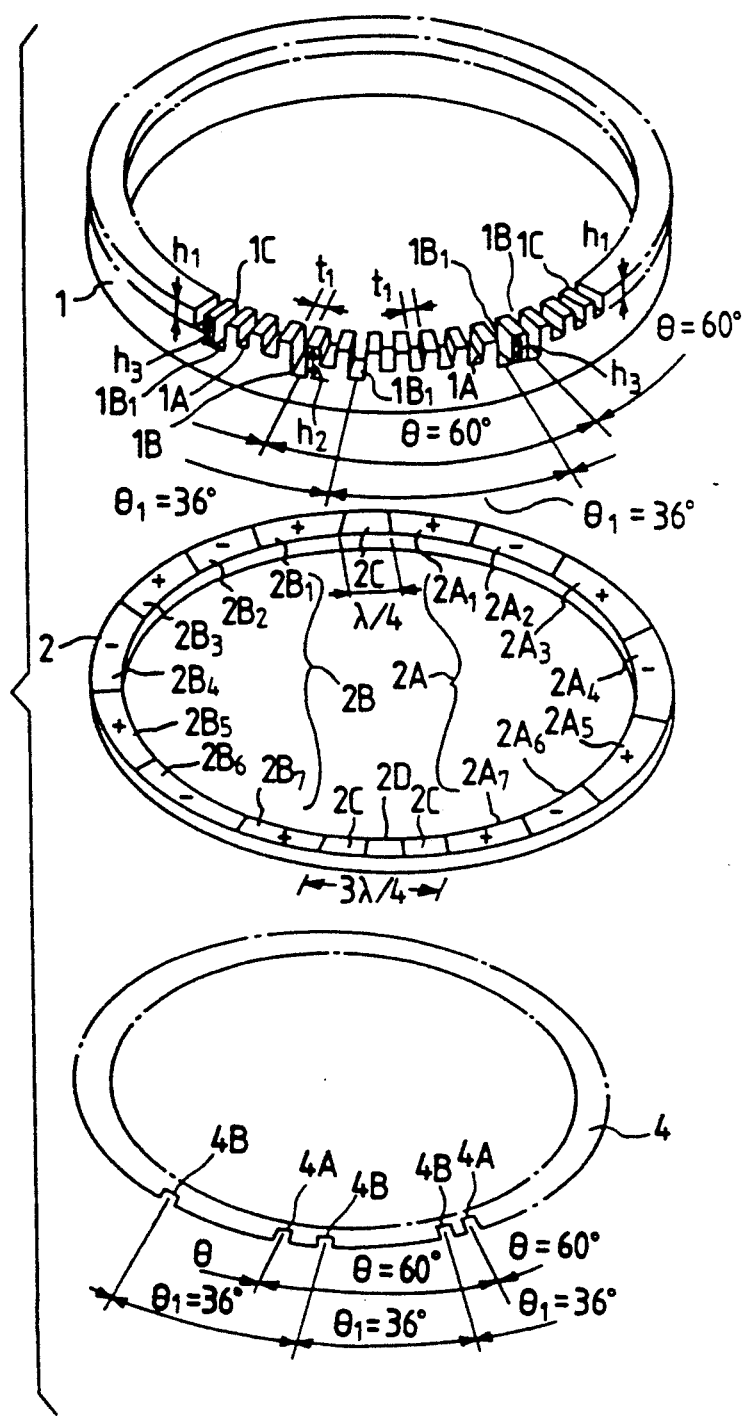
FIG. 11 is an exploded perspective view of the essential portions of another embodiment of the vibration wave motor in a photo-taking lens for a single-lens reflex camera to which the present invention is applied.

FIG. 11 is a perspective view of the essential portions of the resilient member 1 and the piezo-electric element 2 as the electro-mechanical energy conversion element of a vibration wave motor in a photo-taking lens for a single-lens reflex camera to which the present invention is applied. The photo-taking lens shown in FIG. 11 is substantially the same as the photo-taking lens shown in FIGS. 2 and 3 and therefore, only the elements thereof differing from those of the photo-taking lens shown in FIG. 2 will be described and the other elements need not be described.

In FIG. 11, the reference numeral 1 designates a circular ring-like resilient member forming the main constituent portion of a vibration wave motor, and the surface of contact thereof with the rotor 3 (see FIG. 2) as a moving member is formed with a number of grooves 1A of width $t_1$ and depth $h_1$ over the full periphery thereof. Some of these grooves are deep grooves of depth $h_2$ as shown as 1B. When the number of the waves of a vibration wave which produces noise is e.g. three (hereinafter, the flexural vibration wave when this number of waves are generated in the resilient member 1 will be referred to as the 3rd-order mode flexural vibration wave, and the flexural vibration wave when n waves are generated in the resilient member 1 will be referred to as the nth-order mode flexural vibration wave), six such deep grooves 1B are provided at an interval of pitch $\theta = 60°$ or an interval approximate thereto (in this case, noise is suppressed to such a degree that there is no problem in practical use). 1B$_1$ denote second deep grooves of width $t_1$ and depth $t_3$, and since the second deep grooves 1B$_1$ are deep grooves for preventing noise from being produced by the 5th-order mode flexural vibration wave, they are provided at an interval of pitch $\theta_1 = 36°$ or an interval approximate thereto over the full periphery of the resilient member 1 (in this case, noise is suppressed to such a degree that there is no problem in practical use). When the flexural vibration wave which produces noise is n$_1$th-order and n$_2$th-order mode flexural vibration wave, the deep grooves 1B are provided on the resilient member 1 at an interval of $$\theta = \frac{360°}{2n_1}$$

or an interval approximate thereto, and the deep grooves 1B$_1$ are provided on the resilient member 1 at an interval of $$\theta = \frac{360°}{2n_2}$$

or an interval approximate thereto. The reference numeral 2 designates a piezo-electric element such as PZT as an electro-mechanical energy conversion element. The piezo-electric element 2, as in the prior-art device shown in FIG. 2, is attached to one end surface of the resilient member 1 by an adhesive agent. Areas 2A$_1$–2A$_7$ forming the A phase driving area of the piezo-electric element 2 and areas 2B$_1$–2B$_7$ forming the B phase driving area of the piezo-electric element 2 are alternately polarized in different directions of polarization as shown in FIG. 11, and between the area 2A$_1$ in the A phase driving area and the area 2B$_1$ in the B phase driving area, there is provided a common electrode 2C which is common to the A phase and B phase driving areas and connected to the earth of a drive source, not shown. The width of the areas 2A$_1$–2A$_7$ and 2B$_1$–2B$_7$ forming the A phase and B phase driving areas, respectively, is set to $\frac{1}{2}$ of the wavelength $\lambda$ of the flexural vibration wave of the resilient member 1, and further the sum of the widths of the common electrode 2C and sensor electrode 2D is set to the wavelength $\lambda$. Electrodes on the areas 2A$_1$–2A$_7$ forming the A phase driving area which are provided on the side opposed to the common electrode 2C are connected to a first AC power source, not shown. Electrodes on the areas 2B$_1$–2B$_7$ forming the B phase driving area which are provided on the side opposed to the common electrode 2C are connected to a second AC power source, not shown, which outputs an AC signal having a phase difference of 90° with respect to the output signal of the first AC power source. Respective ones of the A phase driving areas 2A$_1$–2A$_7$ and respective ones of the B phase driving areas 2B$_1$–2B$_7$ corresponding to respective ones of the areas 2A$_1$–2A$_7$ are provided with a spacing of $\lambda/4$ therebetween.

The operation of the photo-taking lens of such construction will now be described. When AC signals are supplied from the first and second AC power sources to the A phase driving area and the B phase driving area of the piezo-electric element 2, a travelling vibration wave comprising eight waves, in other words, an 8th-order mode travelling vibration wave, is generated in the resilient member 1 by the flexural vibration of the piezo-electric element 2, and the rotor 3 (see FIG. 2) is rotated about the optic axis L by the vibration wave. As a result, a focusing lens 27 is moved along the optic axis L, whereby the focusing operation is executed.

The above description is the description of the operation when the vibration wave motor operates normally, and description will hereinafter be made of the operation when the n$_1$th-order mode and n$_2$th-order mode flexural vibration waves which may produce noise during the operation or from the start of the operation, for example, the 3rd-order mode and 5th-order mode flexural vibration waves, are generated on the resilient member 1.

In the case of the resilient member which is non-uniform in dynamic rigidity as shown in FIG. 11, the natural frequency $f_1$ of the resilient member 1 corresponding to the 3rd-order mode vibration wave having the locations of the deep grooves 1B as modes is high, while the natural frequency $f_2$ of the resilient member 1 corresponding to the 3rd-order mode vibration wave having the locations of the deep grooves 1B as loops is lower than the aforedescribed natural frequency $f_1$.

Thus the natural frequencies of the resilient member 1 at the respective positions of the 3rd-order mode vibration waves differ from each other and therefore, the 3rd-order mode vibration wave which may produce noise cannot become a travelling wave and accordingly, even if the 3rd-order mode vibration wave is generated due to some cause or other, noise will not be produced thereby.

Also, the natural frequency $f_3$ of the resilient member 1 corresponding to the 5th-order mode vibration wave having the locations of the deep grooves $1B_1$ as modes is high, while the natural frequency $f_4$ of the resilient member 1 corresponding to the 5th-order mode vibration wave having the locations of the deep grooves $1B_1$ as loops is lower than the aforementioned natural frequency $f_3$.

Thus the natural frequencies of the resilient member 1 at the respective positions of the 3rd-order mode vibration waves differ from each other and therefore, the 5th-order mode vibration wave which may produce noise can neither become a travelling wave and accordingly, even if the 5th-order mode vibration wave is generated due to some cause or other, noise will not be produced thereby.

In the present embodiment, particular ones of the grooves 1A provided at an interval of 7.5° are made deep to thereby form the second deep grooves $1B_1$ and therefore, the interval $\theta_1$ between the deep grooves $1B_1$ does not completely agree with $\theta_1 = 36°$, whereas the aforedescribed noise can be prevented to such a degree that there is no problem in practical use as previously described.

In the embodiment shown in FIG. 11, the deep grooves 1B and $1B_1$ for making the dynamic rigidity of the resilient member 1 partly non-uniform are provided at predetermined locations on the resilient member 1, i.e., locations corresponding to integer times $\frac{1}{2}$ of the wavelenghts $\lambda_1$ and $\lambda_2$ of the 3rd-order mode and 5th-order mode vibration waves which may produce noise (hereinafter referred to as $\gamma\lambda_1/2$ and $\gamma\lambda_2/2$, and $\gamma$ being an integer), but even if the grooves at the locations of the deep grooves 1B are made shallow to thereby make the dynamic rigidity of the resilient member 1 partly non-uniform, there will be obtained an effect similar to that previously described.

Further, in the above-described embodiment, portions of non-uniform dynamic rigidity are provided at locations on the resilient member 1 which correspond to $\gamma\lambda_1/2$ and $\gamma\lambda_2/2$ of the wavelengths $\lambda_1$ and $\lambda_2$ of the vibration waves which may produce noise, but alternatively, the resilient member 1 may be a uniform resilient member as shown in FIG. 3, and at predetermined locations on the circular ring-like vibration insulating member 4 shown in FIG. 2, i.e., locations corresponding to $\gamma\lambda_1/2$ and $\gamma\lambda_2/2$ of the wavelengths $\lambda_1$ and $\lambda_2$ of the vibration waves which may produce noise, portions of non-uniform dynamic rigidity of the resilient member 1 may be provided by cut-aways 4A and 4B (see FIG. 11), holes or the like, and also a similar measure may be taken for the vibration absorbing member 5 and the output transmitting member 25 shown in FIG. 2. Saying in addition, the non-uniform portions as previously described can be provided at predetermined locations on a constituent of the vibration wave motor or a constituent of a device connected to the motor, i.e., locations corresponding to $\gamma\lambda_1/2$, $\gamma\lambda_2/2$ and $\gamma\lambda_n/2$ of the wavelengths $\lambda_1$, $\lambda_2$ and $\lambda_n$ of a plurality of vibration waves which may produce noise, thereby preventing noise.

Figure 12:
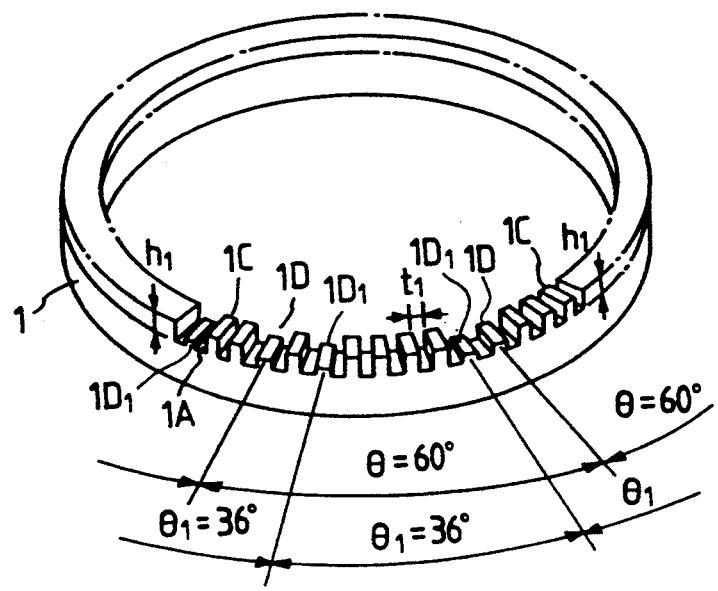
FIGS. 12 to 15 are perspective views of the essential portions of another embodiment of the vibration wave motor shown in FIG. 11 to which the present invention is applied.

FIG. 12 shows another embodiment of the resilient member 1 shown in FIG. 11, and this embodiment is one in which some of the teeth 1C shown in the embodiment of FIG. 11, i.e., some of the teeth 1C at the locations corresponding to $\gamma\lambda/2$ of the wavelength $\lambda$ of the 3rd-order mode vibration wave which may produce noise, are planed to form teeth 1D of smaller height and some of the teeth 1C at the locations corresponding to $\gamma\lambda/2$ of the wavelength $\lambda$ of the 5th-order mode vibration wave which may produce noise are planed to form teeth $1D_1$ of still smaller height than the teeth 1D, whereby the dynamic rigidity of the resilient member 1 is made partly non-uniform in portions of the resilient member.

Figure 13:
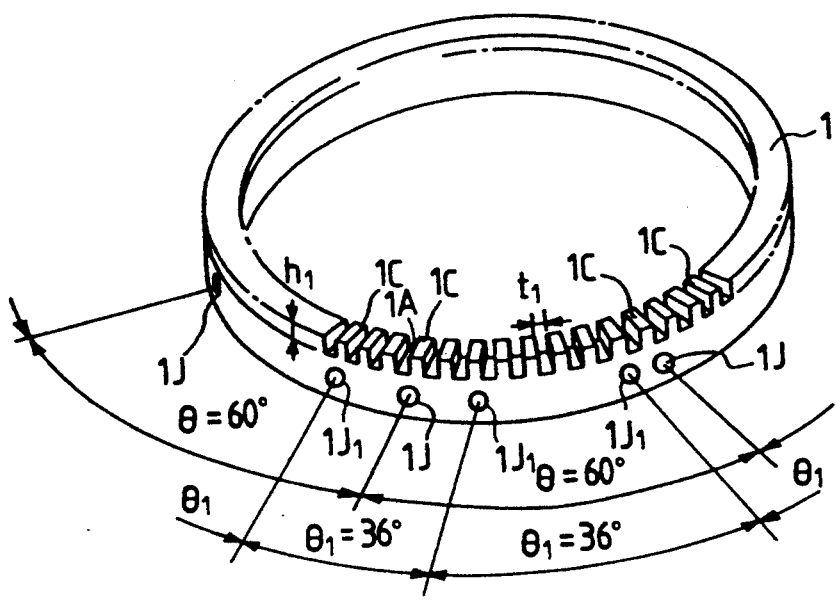
Figure 14:
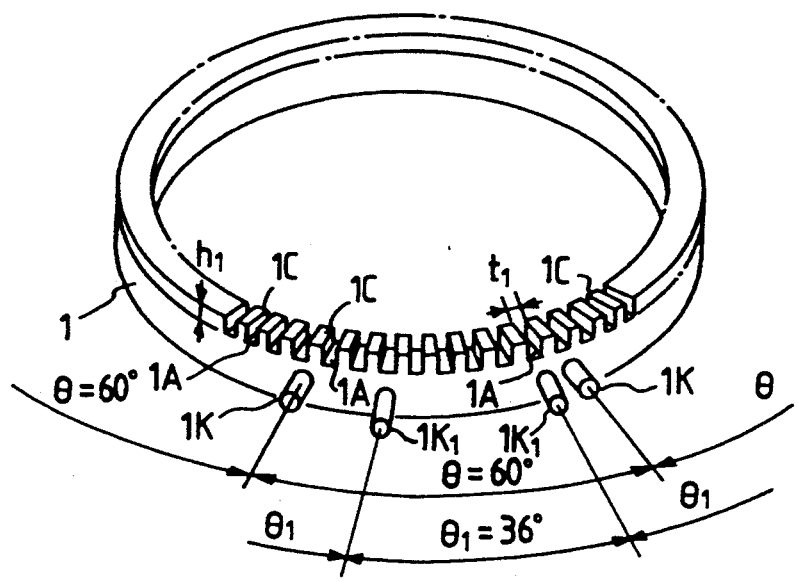

FIG. 13 shows still another embodiment of the resilient member 1 shown in FIG. 11, and this embodiment is one in which, instead of the grooves 1B and $1B_1$ shown in FIG. 11, a plurality of holes 1J and $1J_1$ of a predetermined depth are provided at the locations of the grooves 1B and $1B_1$, FIG. 14 shows an embodiment in which, instead of the holes 1J and $1J_1$, a plurality of projections 1K and $1K_1$ are secured to the resilient member 1, whereby there are provided portions for making the dynamic rigidity of the resilient member 1 partly non-uniform.

Figure 15:
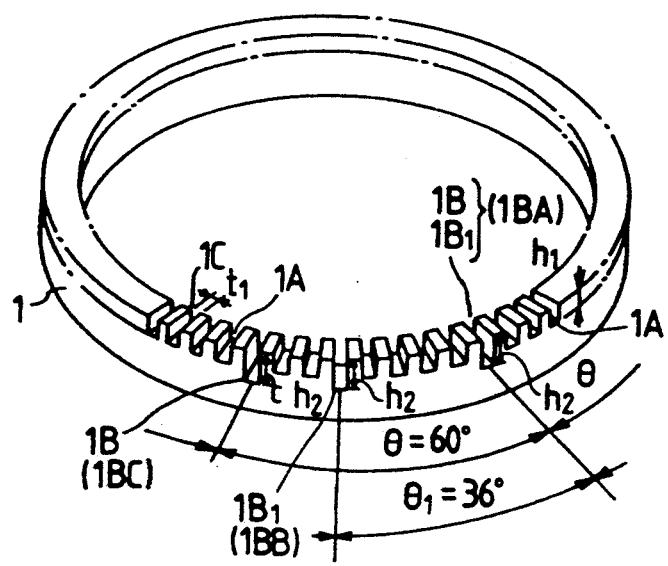

FIG. 15 shows another embodiment of the resilient member 1 shown in FIG. 11, and this embodiment is one in which one of the plurality of deep grooves 1B shown in FIG. 11 and one of the plurality of second deep grooves $1B_1$ shown in FIG. 11 are provided at the same location. Again in this case, a noise preventing effect can be obtained for the same reason as that set forth with respect to the embodiment shown in FIG. 11. In the aforedescribed embodiments of the present invention, the deep grooves 1B, $1B_1$, the cut-aways 4B, 4A, the teeth 1D, $1D_1$, the holes 1J, $1J_1$ and the projections 1K, $1K_1$ are provided over the full periphery of the resilient member 1, the vibration insulating member 4 or the like, whereas these noise preventing or noise suppressing means need not always be provided over the full periphery of the resilient member 1, the vibration insulating member 4 or the like, but where the vibration wave which produces noise is only one mode, e.g. 3rd-order mode vibration wave, two of the aforedescribed noise preventing or suppressing means may be provided at locations spaced apart by 60° from each other as shown in FIG. 11, and where as in the embodiment shown in FIG. 5, the vibration waves which produce noise are vibration waves of two or more modes, e.g., 3rd-order mode and 5th-order mode, only three of the aforedescribed noise preventing or suppressing means may be provided, that is, for example, in the embodiment of FIG. 15, only the three deep grooves 1BA, 1BB and 1BC clearly shown in FIG. 15 will do, and in the case of vibration waves of three modes, i.e., 3rd-order, 5th-order and 7th-order modes, only four of the aforedescribed noise preventing or suppressing means will do. By adopting such simple structure, the members constituting the vibration wave motor can be manufactured inexpensively, and this in turn leads to the advantage that the vibration wave device can be manufactured inexpensively.

While the above-described embodiments have been shown as circular ring-like vibration wave devices, the present invention can be applied not only to such vibration wave devices, but also to a vibration wave device in whcih the resilient member is of a disk-like shape or an elliptical shape, as well as a vibration wave device of the type in which the resilient member 1 itself is moved by a travelling vibration wave.

Figure 16:
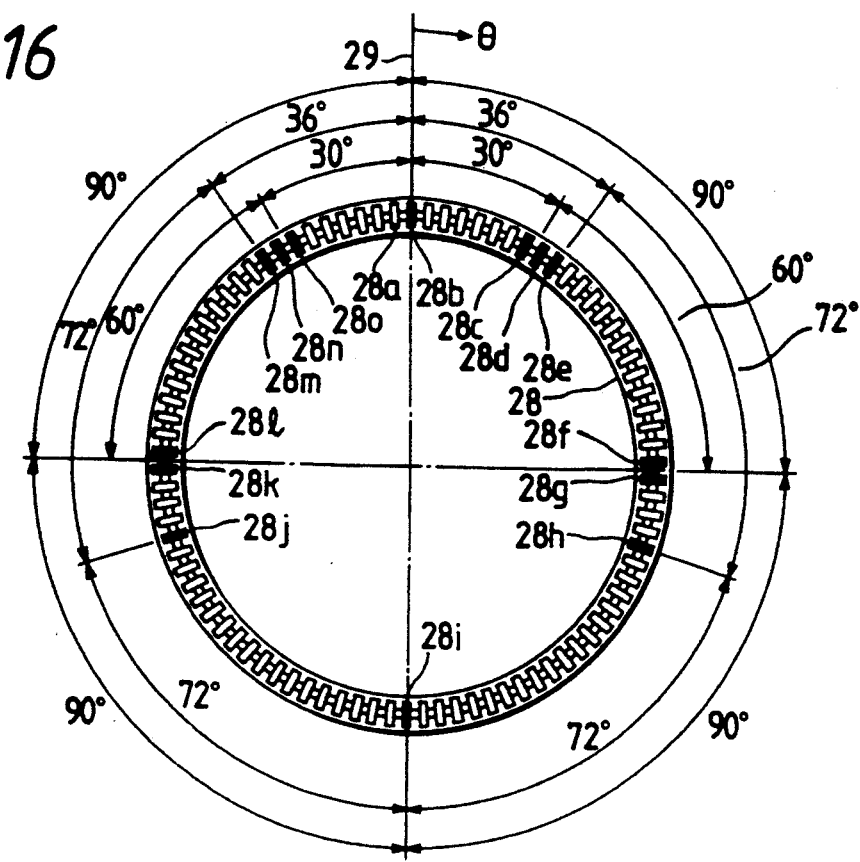
FIG. 16 is a plan view of a resilient member showing another embodiment of the vibration wave motor according to the present invention.

FIG. 16 is a plan view of a resilient member showing another embodiment of the vibration wave motor according to the present invention.

The resilient member 28 according to the present embodiment is formed into a circular ring-like shape as shown in FIG. 16 and has a plurality of grooves formed in the surface of pressure contact thereof with a moving member (not shown) to achieve an enlarged amplitude.

In the present embodiment, ninety such grooves are formed at a pitch of 4°, and in addition to the above-mentioned purpose of achieving an enlarged amplitude, in order to prevent the generation of a travelling wave of unnecessary mode, the depth h of fourteen grooves (hereinafter referred to as the deep grooves) 28b, 28c, 28d, 28e, 28f, 28g, 28h, 28i, 8j, 28k, 28l, 28m, 28n and 28o painted out in black in FIG. 16 is made somewhat greater, e.g. by 0.2 mm, than the depth of the other grooves 28a (seventy-six in total) to thereby change the dynamic rigidity. The vibration member of the present embodiment is such that the 7th-order mode (7-wave mode) of the flexural vibration outside the ring surface is the driving mode.

Accordingly, the flutter produced when the motor is driven is of a lower-order mode than the driving mode and thus, is produced as the resonance of one of the 3rd-order, 4th-order, 5th-order and 6th-order (wave) modes or the complex thereof. In the motor according to the prior art, the 2nd-order mode has been hardly produced possibly because it is unstable when the state of contact between the resilient member and the moving member is considered.

The prevention of the production of the flutter will hereinafter be described with respect to a case where the unnecessary mode such as the 5th-order mode occurs in a vibration wave motor having such a resilient member 28 of a non-uniform dynamic rigidity.

The principle of the formation of a travelling vibration wave is such that it is formed by combining two standing waves equal to each other both in wavelength (λ) and number of vibration and deviating by λ/4 in positional phase from each other. Accordingly, to prevent the generation of a travelling wave of the unnecessary mode, design should only be made such that the natural frequencies of two standing waves in the unnecessary mode formed on the resilient member 28 do not become equal to each other, and for that purpose, in the present embodiment, the deep grooves 28b, ..., 28h, ..., 28o are formed to thereby achieve the non-uniformity of the dynamic rigidity of the resilient member 28.

The fact that in the formation of a travelling wave, two standing waves deviate by λ/4 in positional phase from each other premises that assuming that the loop of one of the standing waves is at any one point in the circumferential direction of the resilient member 28, the node of the other standing wave must be at that point.

In the 5th-order mode vibration wave, one wavelength formed on the resilient member 28 is of 72° pitch. Here, assuming that a standing wave of five waves having the deep groove 28b as a node is generated, that standing wave has the deep grooves 28e, 28h, 28i, 28j and 28m as the positions of loops, and the natural frequency of the resilient member 28 corresponding to this standing wave is defined as $f_{rc}$. Also, assuming that a standing wave of five waves having the deep groove 28b as a loop is generated, that standing wave has the deep grooves 28e, 28h, 28i, 28j and 28m as the positions of nodes, and the natural frequency of the resilient member 28 corresponding to this standing wave is defined as $f_{rs}$.

In order that the 5th-order mode travelling wave may be generated, the natural frequencies $f_{rs}$ and $f_{rc}$ of the both standing waves need be equal to each other or the difference therebetween $\Delta f_{r5} = |f_{rs} - f_{rc}|$ need be small, and if conversely this difference $\Delta f_{r5}$ between the natural frequencies is great, the 5th-order mode travelling wave will not be generated.

Generally, the natural frequency $f_r$ when the mass is m and the rigidity is k is $$f_r = \frac{1}{2\pi}\sqrt{\frac{k}{m}}.$$

The deep groove portions are small in flexural rigidity because the plate thickness of the resilient member is small. Accordingly, assuming that the flexural rigidity when the locations of the deep grooves are loops is $k_c$ and the flexural rigidity when the locations of the deep grooves are modes is $k_s$, $$k_s > k_c$$

that is $$f_{rs} > f_{rc}$$

because the plate thickness of the loop locations when the locations of the deep grooves are nodes is great.

Accordingly, the natural frequencies $f_{rs}$ and $f_{rc}$ in the 5th-order mode differ in number of vibration from each other and the difference therebetween is great and therefore, the number of vibration of the 5th-order mode which may produce flutter cannot become a travelling wave, and even if the number of vibration of the 5th-order mode is generated due to some cause or other, flutter will not be produced thereby.

Also, it is apparent that the effect of preventing the production of such flutter is more remarkable as the difference $\Delta f_{r5}$ between the natural frequencies becomes greater.

The foregoing description is of a case where the unnecessary mode is the 5th-order mode, but in the resilient member 28 of the present embodiment, design is made such that with respect also to unnecessary modes such as the 6th-order mode, the 4th-order mode and the 3rd-order mode, besides the 5th-order mode, the formation of a travelling wave is precluded as in the case of the 5th-order mode.

That is, in the case of the 4th-order mode, the deep grooves 28b, 28f, 28g, 28i, 28k and 28l make the dynamic rigidity non-uniform and the difference $\Delta f_{r4}$ in natural frequency is made to differ at the position of the vibration wave thereof, thereby preventing the formation of the 4th-order mode travelling wave.

In this case, however, ninety grooves of equal pitch formed on the full periphery of the resilient member 28 cannot be divided by 4 and therefore, 90° pitch which is one wavelength of the 4th-order mode is employed with the intermediate portion between the deep grooves 28f and 28g (and also between 28k and 28l) as the central position.

Also, in the case of the 3rd-order mode and the 6th-order mode, the deep grooves 28c, 28d, 28f, 28g, 28k, 28l, and 28n and 28o make the dynamic rigidity non-uniform and the differences $\Delta f_{r3}$ and $\Delta f_{r6}$ in natural frequency are made to differ from each other at the positions of the vibration waves thereof to thereby prevent the formation of the 3rd-order and 6th-order mode travelling waves.

Again in this case, however, with the intermediate portions between the deep grooves 28c and 28d, between the deep grooves 28f and 28g, between the deep grooves 28k and 28l and between the deep grooves 28n and 28o as the central positions, 60° pitch which is ½ wavelength in the case of the 3rd-order mode and one wavelength in the case of the 6th-order mode is employed.

FIG. 19 shows the differences $\Delta f_{rn}$ between the natural frequencies of these nth-order modes found with respect to the respective modes. In FIG. 19C, represents the case shown in FIG. 16 (hereinafter the deep groove pattern of FIG. 16 will be abbreviated as the pattern C). As can be seen from FIG. 19, also in the 7th-order mode for driving, a difference $\Delta f_{r7}$ in natural frequency is caused by the non-uniformity of the dynamic rigidity, but the amount thereof is small. Moreover, the differences $\Delta f_{r3}$, $\Delta f_{r4}$, $\Delta f_{r5}$ and $\Delta f_{r6}$ in natural frequency of the 3rd-order, 4th-order, 5th-order and 6th-order modes occurring during noise are greater than $\Delta f_{r7}$ in the case of the 7th-order mode and therefore, it is seen that the flutter preventing effect is great. That is, the driving of the motor is not adversely affected and moreover, it is difficult for flutter to occur.

Figure 17:
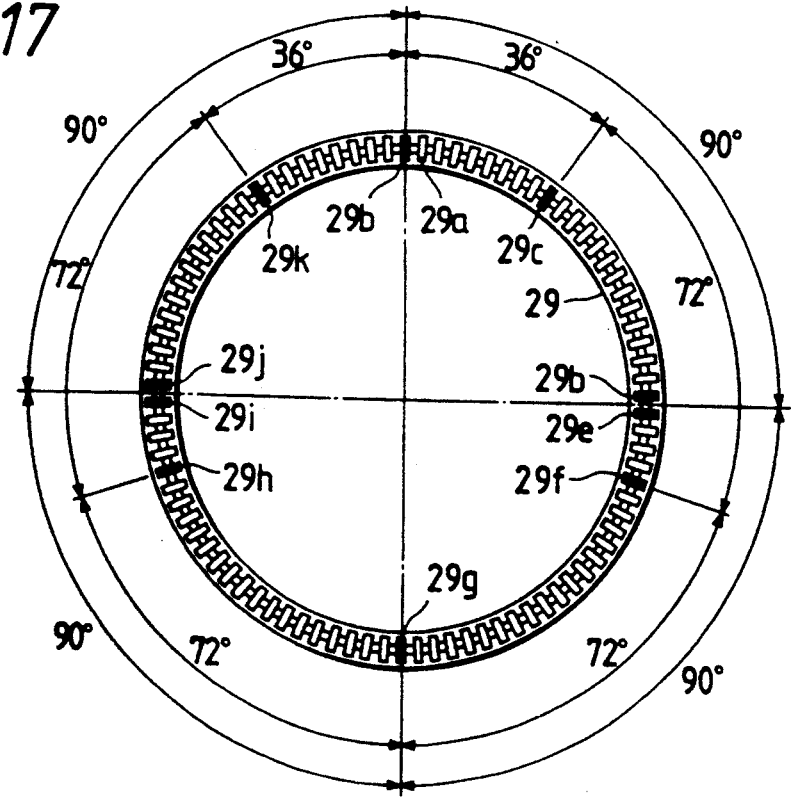
FIG. 17 is a plan view of a resilient member showing a modification of the FIG. 16 embodiment.

FIG. 17 is a plan view of a resilient member showing a modification of the FIG. 16 embodiment.

The deep groove pattern of the resilient member 29 according to the present embodiment is such that the portions painted out in black are grooves which are somewhat deeper, e.g. by 0.2 mm, than the other grooves 29a. This deep groove pattern is the same as the deep groove pattern C shown in FIG. 16 except for the absence of deep grooves 28c, 28d, 28n and 28o. That is, it is a pattern which makes it difficult for the 4th-order and 5th-order mode vibration waves to become a travelling wave and is effective to prevent the occurrence of flutter caused by those modes. The difference $\Delta f_{rn}$ in natural frequency of each mode in this case is shown by A in FIG. 19. Hereinafter this deep groove pattern will be referred to as the pattern A.

In the pattern A according to the present embodiment, the difference $\Delta f_{r6}$ in natural frequency in the 6th-order mode appears greatly. The difference $\Delta f_{r7}$ in natural frequency in the 7th-order mode for driving is also greater than in the case of the aforedescribed pattern C and therefore, as compared with the vibration wave motor of the pattern C, the vibration wave motor of the present embodiment is great in the reduction in the motor output and efficiency, but the formation of the 6th-order mode travelling wave can be prevented.

Figure 18:
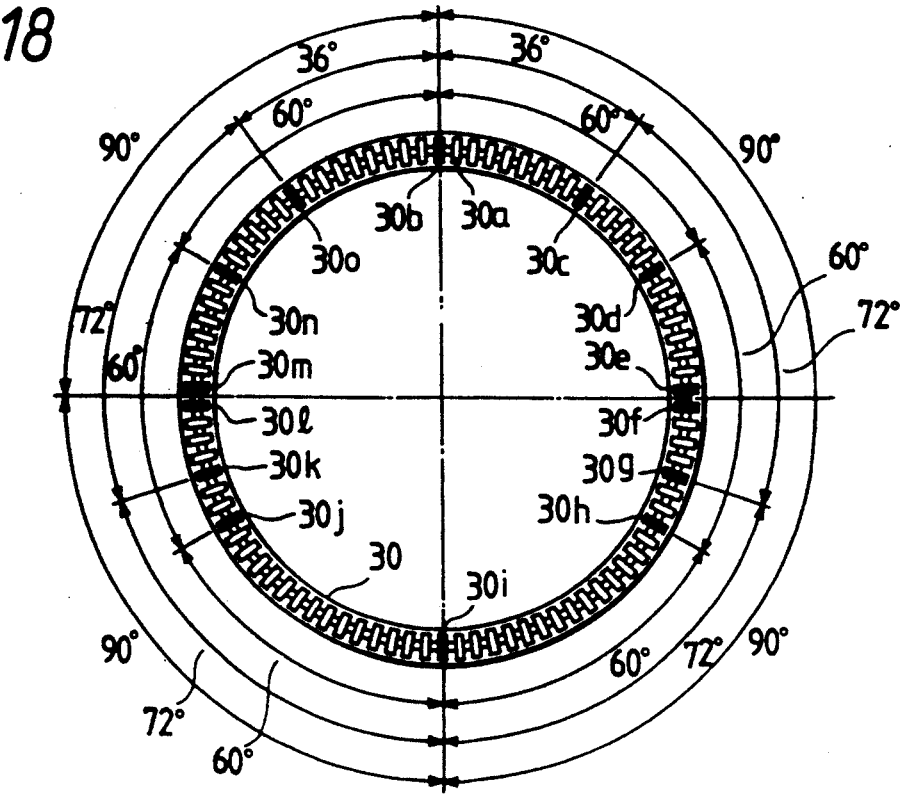
FIG. 18 is a plan view of a resilient member in a further modification of the FIG. 16 embodiment.

FIG. 18 is a plan view of a resilient member 30 in still another modification of the FIG. 16 embodiment.

The deep groove pattern of the resilient member 30 according to the present embodiment is such that portions painted out in black are grooves which are somewhat deeper, e.g. by 0.2 mm, than the other grooves 30a. This deep groove pattern, as compared with the deep groove pattern A of the embodiment shown in FIG. 17, is a pattern in which deep grooves (30b), 30d, 30h, (30i), 30j and 30n of 60° pitch which is one wavelength of the gap in the full periphery or the like are added as a countermeasure for preventing the flutter of the 6th-order mode. That is, it is a simplest conceivable pattern for preventing the flutter of the 3rd-order-4th-order-5th-order-6th-order mode. The difference $\Delta f_{rn}$ in natural frequency in each mode in this case is shown by B in FIG. 19. Hereinafter this deep groove pattern will be referred to as the pattern B. As shown in FIG. 19, the difference $\Delta f_{r6}$ in natural frequency in the 6th-order mode is about twice as great as that in the pattern A and thus, it is difficult for the flutter of the 6th-order mode to occur. Since the difference $\Delta f_{r7}$ in natural frequency in the 7th-order mode for driving is greater than in the pattern A, the present embodiment is great in the reduction in the motor output and efficiency.

In the above-described embodiments of FIGS. 16 to 18, the deep grooves are made deeper by 0.2 mm than the other grooves, and if this depth is further increased, there will be obtained a more remarkable effect.

Also, in each of these embodiments, the dynamic rigidity of the resilient member is changed by the deep grooves, but alternatively, the additional mass, the additional resistance or the like may be increased or decreased to thereby change the dynamic rigidity of the resilient member, or the dynamic rigidity may be changed by the complex thereof.

Further, not only the dynamic rigidity of the resilient member, but also for example, the dynamic rigidity of the moving member (rotor 3) shown in FIG. 2 or its surrounding member such as the vibration insulating member 4 or the vibration absorbing member 5 may be made non-uniform to obtain a similar effect.

Figure 20:
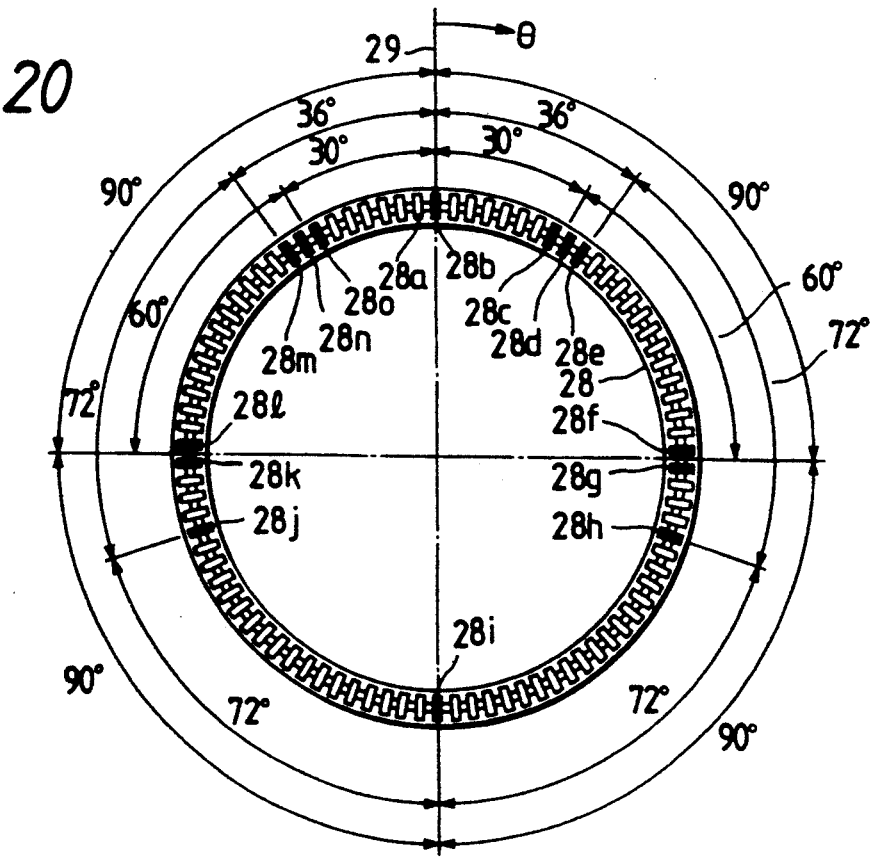
FIG. 20 is a plan view of a resilient member showing another embodiment of the vibration wave motor according to the present invention.

FIG. 20 is a plan view of a resilient member showing still another embodiment of the vibration wave motor according to the present invention.

The resilient member 28 according to the present embodiment is formed into a circular ring-like shape as shown in FIG. 3 and has a plurality of grooves formed in its surface of pressure contact with the moving member (not shown) to achieve an enlarged amplitude.

In the present embodiment, ninety such grooves are formed at a pitch of 4°, and in order to prevent the generation of unnecessary mode travelling wave, in addition to the aforementioned purpose of achieving an enlarged amplitude, the depth h of fourteen grooves 28b, 28c, 28d, 28e, 28f, 28g, 28h, 28i, 28j, 28k, 28l, 28m, 28n and 28o painted out in black (hereinafter referred to as the deep grooves) is made somewhat greater, e.g. by 0.2 mm, to thereby change the dynamic rigidity. The vibration member of the present embodiment uses the 7th-order mode (seven-wave mode) of the flexural vibration outside the ring surface as the driving mode.

Accordingly, the flutter occurring when the motor is driven is of a lower-order mode than the driving mode, and thus occurs as the resonance of one of the 3rd-order, 4th-order, 5th-order and 6th-order (wave) modes or the complex thereof. In the motor shown as an example of the prior art, the 2nd-order mode has hardly occurred possibly because it is unstable when the state of contact between the resilient member and the moving member is considered.

The prevention of occurrence of flutter will hereinafter be described with respect, for example, to a case where the unnecessary mode such as the 5th-order mode has occurred in a vibration wave motor having such a resilient member 28 of non-uniform dynamic rigidity.

The principle of the formation of a travelling vibration wave is such that it is formed by combining two standing waves which are equal both in wavelength ($\lambda$) and number of vibration to each other and deviate by $\lambda/4$ from each other in positional phase. Accordingly, to prevent the generation of a travelling wave of the unnecessary mode, design should only be made such that the natural frequencies of two standing waves in the unnecessary mode formed on the resilient member 28 do not become equal to each other, and for that purpose, in the present embodiment, deep grooves 28b, ..., 28h, ..., 28o are formed to thereby achieve the non-uniformity of the dynamic rigidity of the resilient member 28.

The fact that in the formation of a travelling wave, two standing waves deviate by λ/4 from each other in positional phase premises that assuming that the loop of one of the standing waves is at any one point in the circumferential direction of the resilient member 28, the mode of the other standing wave must be at that point.

In the 5th-order mode vibration wave, one wavelength formed on the resilient member 28 is of 72° pitch. Here, assuming that a standing wave of five waves having the deep groove 28b as the mode has occurred, that standing wave has the deep grooves 28e, 28h, 28i, 28j and 28m as the positions of loops, and the natural frequency of the resilient member 28 corresponding to this standing wave is defined as $f_{rc}$. Also, assuming that a standing wave of five waves having the deep groove 28b as the loop has occurred, that standing wave has the deep grooves 28e, 28h, 28i, 28j and 28m as the positions of nodes, and the natural frequency of the resilient member 28 corresponding to this standing wave is defined as $f_{rs}$.

In order that the 5th-order mode travelling wave may be generated, it is necessary that the natural frequencies $f_{rs}$ and $f_{rc}$ of the both standing waves be equal to each other or the difference therebetween $\Delta f_{r5} = |f_{rs} - f_{rc}|$ be small, and if this difference $\Delta f_{r5}$ in natural frequency is great, the 5th-order mode travelling wave will not be generated.

Generally, the natural frequency $f_r$ when the mass is m and the rigidity is k is $$f_r = \frac{1}{2\pi}\sqrt{\frac{k}{m}}.$$

In the deep groove portions, the plate thickness of the resilient member is small and therefore, the flexural rigidity k is small. Accordingly, assuming that the flexural rigidity when the locations of the deep grooves are loops is $k_c$ and the flexural rigidity when the locations of the deep grooves are nodes is $k_s$, $$k_s > k_c$$

that is, $$f_{rs} > f_{rc}$$

because the plate thickness at the loop positions when the locations of the deep grooves are modes is great.

Accordingly, the natural frequencies $f_{rs}$ and $f_{rc}$ in the 5th-order mode differ in number of vibration from each other and the difference therebetween is great and therefore, the number of vibration of the 5th-order mode which may produce flutter cannot become a travelling wave, and even if the number of vibration of the 5th-order mode occurs due to some cause or other, flutter will not be produced thereby.

Also, it is apparent that the effect of preventing the production of such flutter is more remarkable as the difference $\Delta f_{r5}$ in natural frequency becomes greater.

The above description is of a case where the unnecessary mode is the 5th-order mode, but in the resilient member 28 of the present embodiment, design is made such that besides the 5th-order mode, with respect also to the unnecessary modes such as the 6th-order mode, the 4th-order mode and the 3rd-order mode, the formation of a travelling wave is precluded as in the case of the 5th-order mode.

That is, in the case of the 4th-order mode, the deep grooves 28b, 28f, 28g, 28i, 28k and 28l make the dynamic rigidity non-uniform and the difference $\Delta f_{r4}$ in natural frequency is made to differ at the position of the vibration wave thereof to thereby prevent the formation of the 4th-order mode travelling wave.

In this case, however, the ninety grooves of equal pitch formed on the full periphery of the resilient member 28 cannot be divided by 4 and therefore, they are of 90° pitch which is one wavelength of the 4th-order mode with the intermediate portion between the deep grooves 28f and 28g (also between 28k and 28l) as the central position.

Also, in the case of the 3rd-order mode and the 6th-order mode, the deep grooves 28c, 28d, 28f, 28g, 28k, 28l, 28n and 28o make the dynamic rigidity non-uniform and the differences $\Delta f_{r3}$ and $\Delta f_{r6}$ in natural frequency are made to differ from each other at the position of the vibration wave thereof to thereby prevent the formation of the 3rd-order and 6th-order mode travelling waves.

Again in this case, however, with the intermediate portions between the deep grooves 28c and 28d, between the deep grooves 28f and 28g, between the deep grooves 28k and 28l and between the deep grooves 28n and 28o as the central positions, ½ wavelength is employed in the case of the 3rd-order mode and 60° pitch which is one wavelength is employed in the case of the 6th-order mode.

FIG. 22 shows the differences $\Delta f_{rn}$ in natural frequency in these nth-order modes found for each mode.

As can be seen from FIG. 22, also in the 7th-order mode for driving, a difference $\Delta f_{r7}$ in natural frequency is caused by the non-uniformity of the dynamic rigidity, but the amount thereof is small. Moreover, the differences $\Delta f_{r3}$, $\Delta f_{r4}$, $\Delta f_{r5}$ and $\Delta f_{r6}$ in natural frequency in the 3rd-order, 4th-order, 5th-order and 6th-order modes which occur during noise are greater than $\Delta f_{r7}$ in the case of the 7th-order mode and therefore, it is seen that the flutter preventing effect is great. That is, it is difficult for the motor driving to be adversely affected and moreover, it is difficult for flutter to occur.

That is, the difference $\Delta f_{rn}$ in natural frequency in each of these modes depends greatly on the deep groove pattern as shown in FIG. 20, i.e., the pattern of the portions of non-uniform dynamic rigidity.

Figure 21:
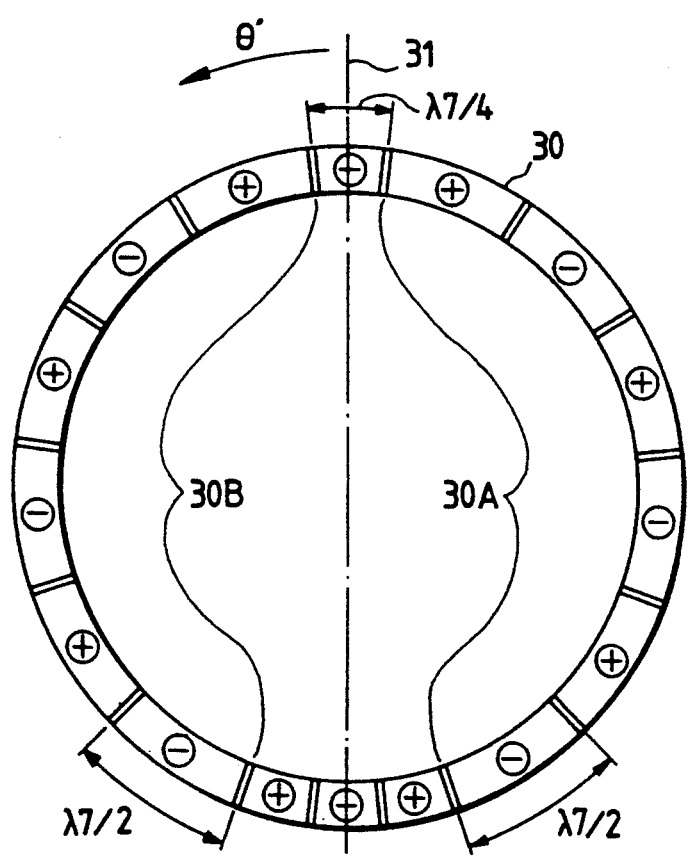
FIG. 21 is a plan view showing the arrangement of piezo-electric elements.

FIG. 21 is a plan view of the piezo-electric element 30 of the present embodiment. That is, it is a view of the piezo-electric element 30 adhesively secured to the resilient member 28 as it is seen from the back side thereof. A group of electrodes designated by 30A are A phase driving electrodes, and form an aggregation of electrodes of $\lambda_7/2$ of the wavelength $\lambda_7$ for seven-wave driving. In FIG. 21, ⊕+⊖ and ⊕−⊖ indicate the signs + and − of the voltage applied, during the polarizing process, to a common electrode (not shown) formed on the back of the piezo-electric element. A group of electrodes denoted by 30B are B phase driving electrodes which are formed at positions out of phase by $\lambda_7/4$ with respect to the A phase driving electrodes.

The A phase driving electrodes 30A and the B phase driving electrodes 30B are line-symmetric with respect to a plane of symmetry 31. During the driving of the motor, alternate voltages which are out of phase with each other by ±90° in time are applied to the A phase driving electrodes 30A and the B phase driving electrodes 30B.

Figure 23:
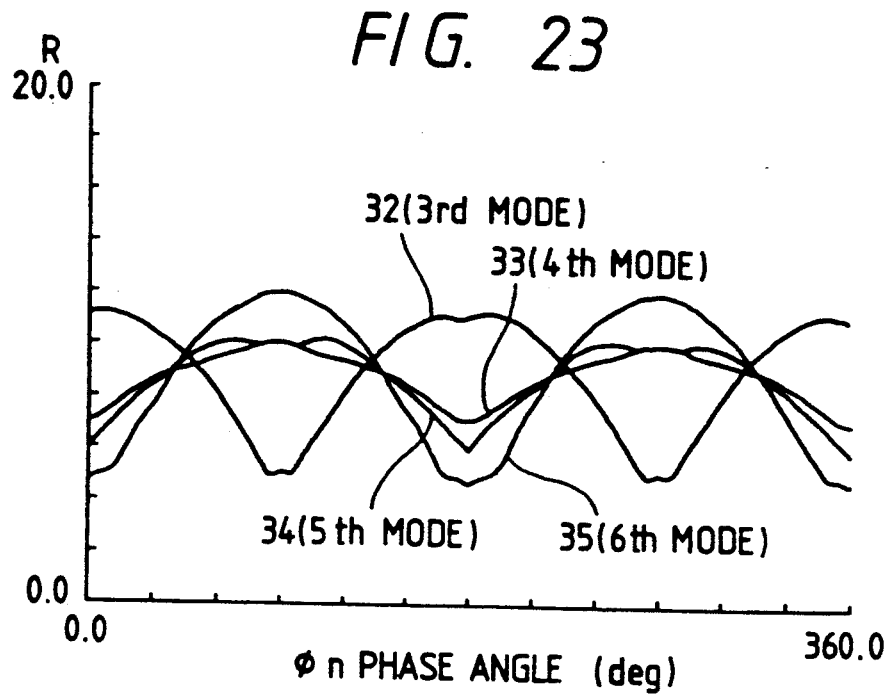
FIGS. 23 and 24 show variations in the dynamic rigidity by the phase of the nth-order mode.
Figure 24:
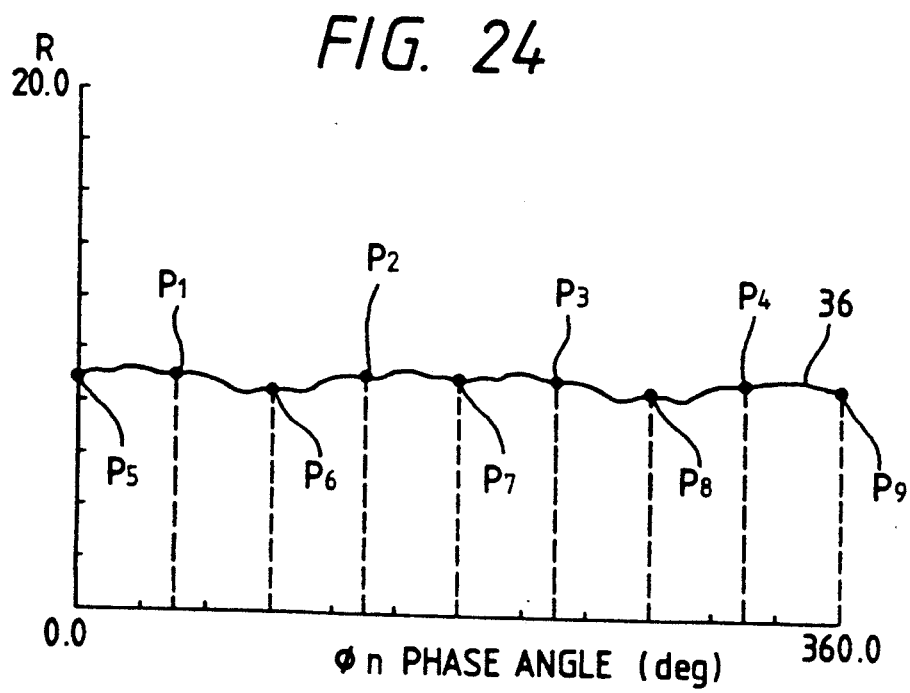

FIG. 23 is a graph in which there is calculated the substantial sum total R of the portions of non-uniform dynamic rigidity (the deep grooves painted out in black in FIG. 20) when the nth-order mode vibration wave travels by an amount corresponding to one wavelength ($\phi_n=360°$) of each mode in a direction $\theta$ from the plane of symmetry 29 of the resilient member 28 shown in FIG. 20. That is, $\theta=\theta_n/n$. The reference numerals 32, 33, 34 and 35 refers to the cases of vibration modes which provide noise, such as the 3rd-order, 4th-order, 5th-order and 6th-order modes. As shown in FIG. 23, each mode plots the maximum and minimum of R at positions whereat the phase $\phi_n$ deviates by about 90°. That is, it is in such a form that the non-uniformity of the dynamic rigidity is maximum and minimum at locations which are about 90° out of phase with each other and a travelling wave is most difficult to generate. FIG. 24 is a graph similar to FIG. 23, but shows the case of the 7th-order mode 36 for driving. From this graph, it is seen that the difference between the maximum and minimum of R is small as compared with the cases of the other modes. That is, the adverse effect upon the 7th-order mode travelling wave is small, though not zero. When the plane of symmetry 29 of the deep groove pattern of the resilient member 28 and the plane of symmetry 31 of the piezo-electric element 30 are made coincident with each other, $P_1$ and $P_3$ are the loop positions of the A phase standing wave when only the A phase 30A is driven (the mode positions of the B phase standing wave when only the B phase 30B is driven), and $P_2$ and $P_4$ are the loop positions of the B phase standing wave (the nose positions of the A phase standing wave). From the fact that the values of R's of $P_1-P_4$ are equal to one another, it is seen that the non-uniformity of the dynamic rigidity imparts only a similar influence to the A phase and B phase driving electrodes. That is, the natural frequency of the A phase standing wave and the natural frequency of the B phase stanidng wave agree with each other and do not adversely affect the driving. However, if the plane of symmetry 29 of the deep groove pattern of the resilient member 28 and the plane of symmetry 31 of the piezo-electric element 30 are made to deviate from each other so as to provide $$\Delta\theta = \frac{45°}{7},$$

$P_5$ ($P_9$) and $P_7$ are the loop positions of the A phase standing wave (the node positions of the B phase standing wave) and $P_6$ and $P_8$ are the loop positions of the B phase standing wave (the node positions of the A phase standing wave, or vice versa.

In this case, the values of R's of $P_5$ ($P_9$) and $P_7$ become greater than the values of R's of $P_6$ and $P_8$. That is, under the influence of the non-uniformity of the dynamic rigidity, the natural frequency of the B phase standing wave becomes higher than the natural frequency of the A phase standing wave and the irregularity of the travelling wave becomes great. From this, it is seen that it imparts the least adverse effect to the driving wave to make the plane of symmetry 29 of the resilient member 28 and the plane of symmetry 31 of the piezo-electric element coincident with each other.

When the size of one of the portions of non-uniform dynamic ridigity is tentatively $R_{oi}$ and the form of the flexural vibration is approximated by $S_{in}$ and the sum total in the entire resilient ring member is considered, the substantial sum total R of the above-described portions of non-uniform dynamic rigidity is $$R(\phi_m) = \sum_{i=1}^{k} R_{oi}|\sin(N\theta_i + \phi_n)|,$$

where k is the number of the portions of non-uniform dynamic rigidity.

If as in the present embodiment, the portions of non-uniform dynamic rigidity are deep grooves, $R(\phi_n)$ represents the distribution of the sum total of the deep grooves by the travelling wave position ($\phi_n$). FIGS. 23 and 24 show a case where $R_{oi}=1$. In the case of the present embodiment, as previously described, k becomes smaller where the loop of vibration is at the position whereat R is great. That is, $f_r$ becomes smaller. Accordingly, the natural frequency of the mode which is the loop of vibration at the position whereat R is maximum becomes minimum, and the natural frequency of the mode which is the loop of vibration at the position whereat R is minimum becomes maximum. In fact, a travelling wave which provides noise assumes a frequency between such maximum and minimum natural frequencies. Accordingly, as the difference between those natural frequencies becomes great, the travelling wave which provides noise deviates more from the resonance point, and the amplitude becomes very small and further is attenuated.

The above embodiment has been described with respect to an example in which the deep grooves are made deeper by 0.2 mm than the other grooves, but it is apparent that if this amount is increased, the effect will become greater, and this value is not restrictive.

A similar effect will also be obtained not only by so changing the depth of the grooves, but also by increasing or decreasing the additional mass or the additional resistance to thereby change the dynamic rigidity or change the dynamic rigidity by the complex thereof. A similar effect will also result if not only the dynamic rigidity of the resilient member but also the dynamic rigidity of its surrounding members such as the rotor and the vibration insulating member 4 shown in FIG. 2 is made non-uniform. Further, the non-uniform pattern of the dynamic rigidity is not limited to the present embodiment, but may be one in which the dynamic rigidity is made equal or approximate to each driving phase.

Figure 25:
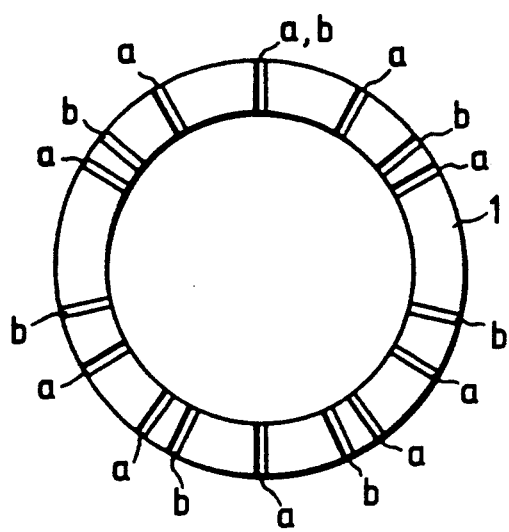
FIG. 25 is a plan view of a resilient member showing another embodiment of the vibration wave motor according to the present invention.
Figure 26:
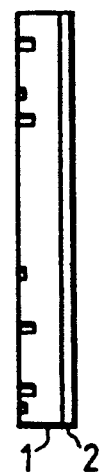
FIG. 26 is a side view of the resilient member shown in FIG. 25.

FIG. 25 is a plan view of a resilient member showing another embodiment of the vibration wave motor according to the present invention, and FIG. 26 is a side view thereof.

The resilient member 1 of the vibration wave motor according to the present embodiment is formed into a circular ring-like shape, and has secured to one end surface thereof a piezo-electric member 2 comprising a plurality of piezo-electric elements. The piezo-electric member 2 has two groups of driving piezo-electric elements, AC voltages having a deviation of 90° therebetween are applied to the two groups of driving piezo-electric elements by a driving circuit, not shown, the application of the AC voltage to one group of piezoelectric elements generates a standing wave of elements generates a standing wave of Sin mode and the application of the AC voltage to the other group of piezo-electric elements generates a standing wave of Cos mode, whereby a travelling wave is formed in the resilient member 1, and description will hereinafter be made with it being understood that in the present embodiment, a travelling wave of seven waves (seven λ) is formed.

In order to prevent the generation of a travelling wave in the other unnecessary modes than the seven waves for driving and prevent the production of the flutter of the motor, flutter vibration preventing grooves a for providing a difference between the natural frequency of one standing wave in the unnecessary modes and the natural frequency of the other standing wave are formed on the other end surface of the resilient member 1, and by these grooves a being formed, for example, at the loop positions of one standing wave in the unnecessary modes, the rigidity of the resilient member is partly reduced to thereby make it difficult for flutter vibration to be generated.

Now, due to the non-uniform dynamic rigidity provided by the flutter vibration preventing grooves a formed in the resilient member 1 to prevent the generation of such flutter vibration, in the vibration mode for driving (in the present embodiment, 30 KHz), a difference is created between the natural frequencies of the two standing waves in the driving mode (this phenomenon will hereinafter be referred to as the division), and in the present embodiment, a difference of 100–200 Hz in natural frequency is created and it is difficult to excite a uniform travelling wave, as previously described.

So, in the present embodiment, in order to make the natural frequencies of the two standing waves in the vibration mode for driving coincident with each other, grooves b (in the present embodiment, seven because the present embodiment is seven-wave driving) are formed at every one wavelength at the loop positions of the mode which is higher in natural frequency.

The reason why the above-mentioned division can be prevented will hereinafter be described with reference to FIG. 27.

When the modal mass of the vibration outside the surface is M and the modal stiffness thereof is K, the natural frequency ω can be found by the following equation:

$$\omega = \sqrt{\frac{K}{M}}$$

Figure 27A:
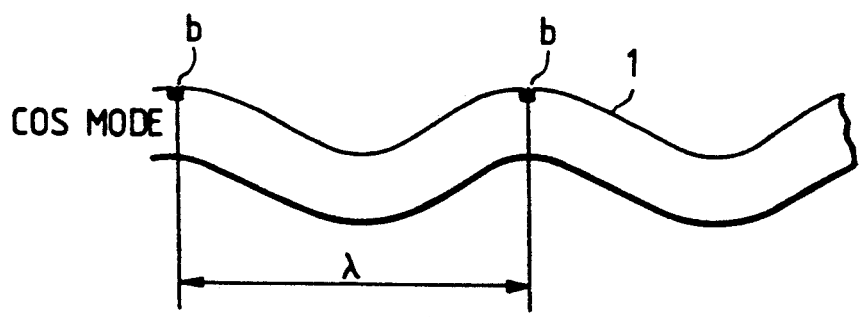
FIGS. 27A and 27B illustrate the principle of the FIG. 25 embodiment.
Figure 27B:
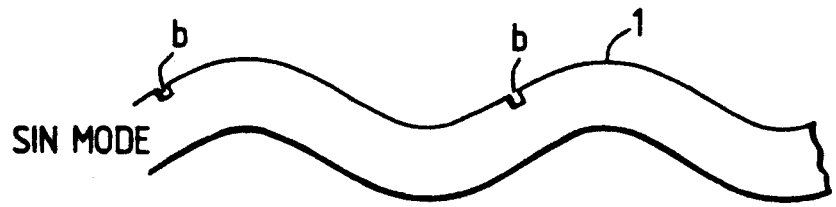

If the resilient member is made thin, the natural frequency ω will be reduced because the amount of reduction ΔK in the modal stiffness K is greater than the amount of reduction ΔM in the modal mass M. Also, when the resilient member is made partly thin, Cos mode is defined as the mode of high natural frequency, and if as shown in FIG. 27A, the loop positions thereof are made partly thin by the grooves b at every one wavelength, the amount of decrease in ΔK in Cos mode having the grooves b at the positions whereat distortion is great (the loop positions) is great because as shown in FIG. 27B, in Sin mode, the positions of the grooves b are the mode positions, and thus the reduction in the natural frequency ω appears remarkably in Cos mode, and if the depth and width of the grooves b are changed, the two natural frequencies in Sin mode and Cos mode will coincide with each other.

Figure 28:
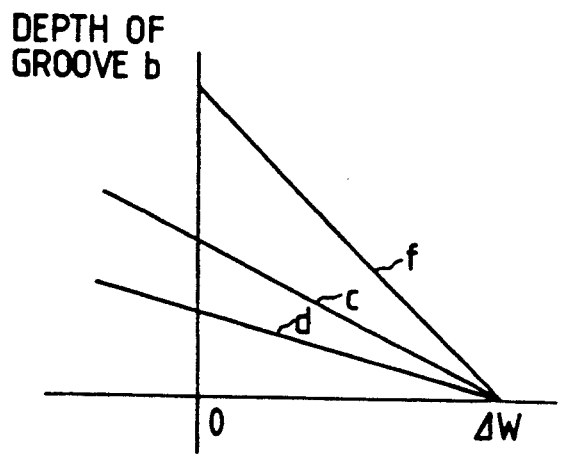
FIG. 28 is a graph showing the relation between the difference in the natural frequency and the depth of groove with the number of grooves as a parameter.

FIG. 28 shows the relation between the depth of the grooves and the difference Δω in natural frequency with the number of the grooves b as a parameter, and c is a graph showing the relation between the difference in natural frequency and the depth of the grooves when the seven grooves b formed in the resilient member 1 are made uniformly deep.

Here, the grooves b need not be at every one wavelength at the loops of Cos mode, and the number thereof may be fourteen at every ¼ wavelength (or ten if omitted on the way), or may be small, e.g., one at the loop position, and in the former case where the number of the grooves is great, the depth of the grooves is such as shown by d in FIG. 28 and the amount of machining for the depth of the grooves can be small, while in the latter case where the number of the grooves is small, the depth of the grooves is such as shown by f in FIG. 28 and the amount of variation in the difference Δω in natural frequency for the groove machining tolerance becomes small and the machining accuracy can be rough.

Figure 29A:
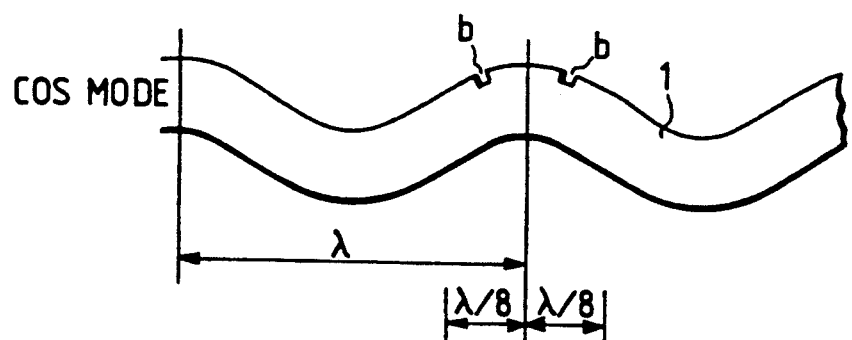
FIGS. 29A and 29B show a modification of the FIG. 25 embodiment.
Figure 29B:
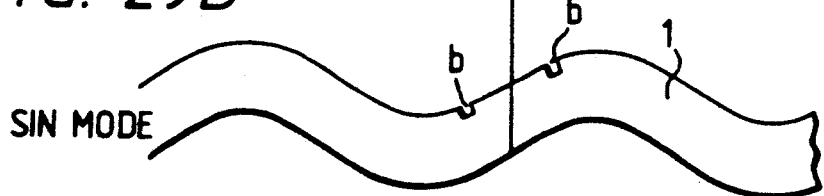

Also, in the present embodiment, the grooves b are located at the loop positions of Cos mode, but if as shown in FIG. 29, the locations of the grooves b are within ±¼ wavelength of the loop positions, the effect of the grooves b appears strongly in Cos mode and a similar effect can be obtained. In this case, the variation in the difference in natural frequency for the depth of the grooves is small as compared with the case where the shape and number of the grooves are the same as those in the present embodiment, or the case where as in the present embodiment, the grooves b are provided at the loop positions.

Figure 30:
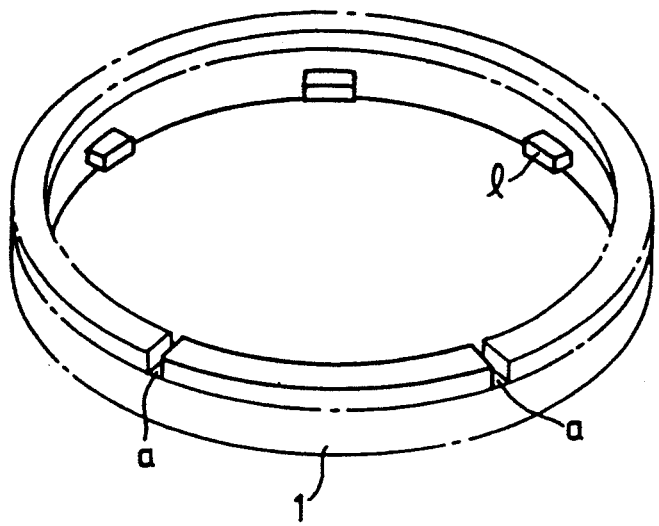
FIG. 30 is a schematic perspective view of another embodiment.

FIG. 30 is a schematic perspective view showing another embodiment of the present invention.

In the FIG. 25 embodiment described above, the natural frequencies of Sin mode and Cos mode in the driving mode divided by the flutter preventing grooves a are made substantially equal to each other by the grooves b, but the distortion of the resilient member driven in small and therefore, in order to reduce the internal loss caused by vibration, in the present embodiment, instead of the grooves b, a plurality of projections ( are provided near the neutral plane of vibration in the resilient member 1 at the loop or mode positions of a standing wave of a mode which is high in natural frequency, and the natural frequencies in the two modes are made coincident with each other by the mass of the projections.

The projections may be used also as a member for receiving the pressure of the rotation restraining member (not shown) of the resilient member 1, or the moving member (not shown).

Figure 31:
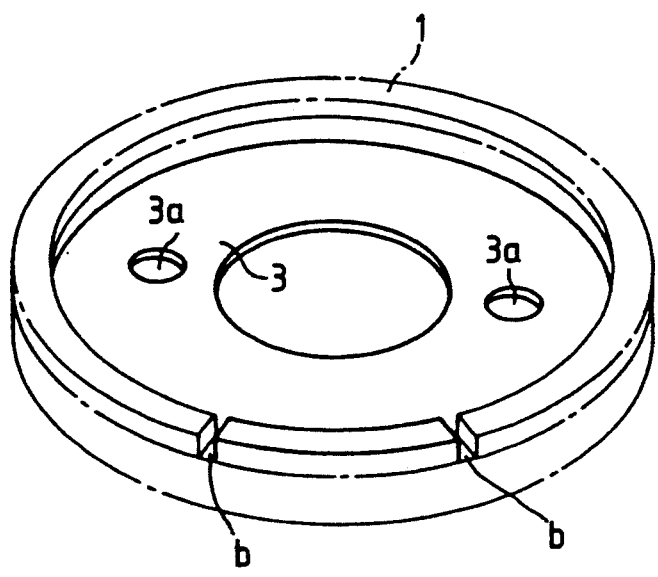
FIG. 31 is a schematic perspective view of another embodiment.

FIG. 31 is a schematic perspective view showing another embodiment of the present invention.

The embodiments of FIGS. 25 and 30 have been shown as an example in which the natural frequencies of the two standing waves of the driving mode are divided by the flutter preventing grooves a, while in the present embodiment, rotation restraining holes 3a are formed in a supporting flange 3 provided on the resilient member 1, and the division of the natural frequencies by the non-uniformity of the dynamic rigidity caused by screw-setting the resilient member to the flange by screws, not shown, is adjusted by the grooves b as in the above-described embodiment.

The division of the natural frequencies by the portions of non-uniform dynamic rigidity of the resilient member may be adjusted by providing portions of non-uniform dynamic rigidity on a resilient member supporting member, not shown, which is mounted on the flange 3 by means of screws.

Figure 32:
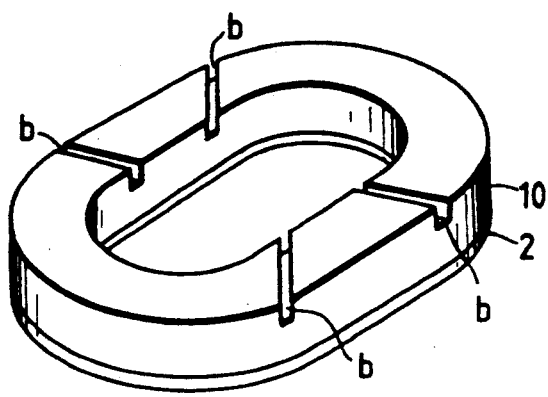
FIG. 32 is a schematic perspective view of another embodiment.

FIG. 32 is a schematic perspective view showing another embodiment of the present invention.

This embodiment is one in which a resilient member 10 is formed into an elliptical shape and the division occurring due to the difference in dynamic rigidity between the rectilinear portions and the arcuate portions of the resilient member 10 is adjusted by grooves b.

Figure 33:
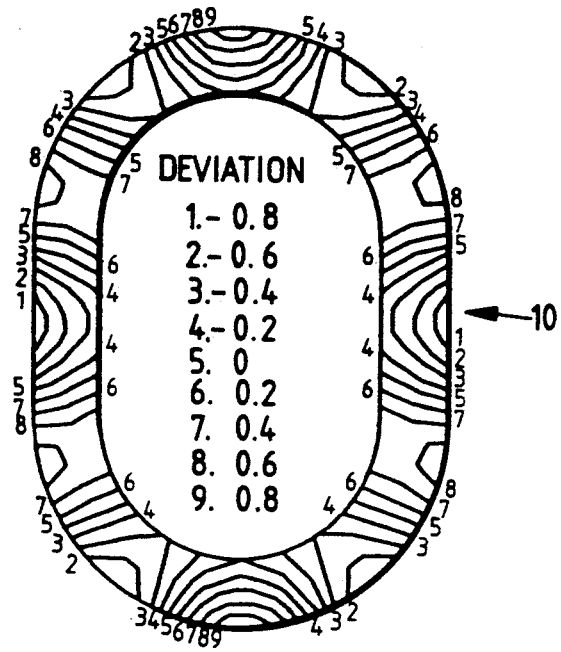
FIG. 33 illustrates the principle of another embodiment.

The reason why in the present embodiment, the grooves b are not perpendicular to the rectilinear portions of the resilient member 10 is that as shown in FIG. 33 (contour lines in this figure show the displacement distribution of modes of low natural frequencies), the loops of the vibration mode are not distributed perpendicularly.

That is, portions of non-uniform dynamic rigidity are provided in accordance with the displacement O (node) distribution of the modes of low natural frequencies, whereby the influence upon the modes of low natural frequencies is made small and the influence upon the modes of high natural frequencies is made great.

Figure 34:
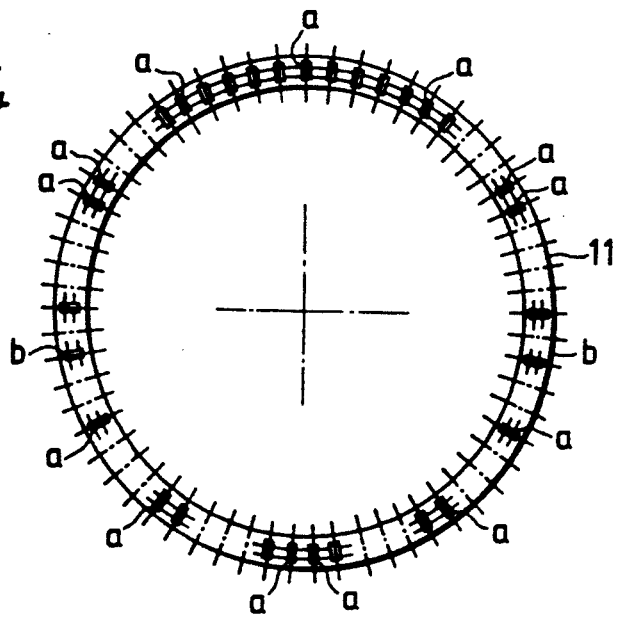
FIG. 34 is a plan view of another embodiment.
Figure 35:
FIG. 35 is a side view of the FIG. 35 embodiment.

FIG. 34 is a plan view of a resilient member showing another embodiment of the present invention, and FIG. 35 is a side view thereof.

In this embodiment, on the side of the resilient member 11 opposite to the side thereof to which a piezo-electric member 2 is secured, a plurality of grooves are formed at an equal pitch along the circumferential direction of the resilient member so as to provide a comb tooth-like shape to thereby lower the neutral axis of vibration and improve the motor efficiency, and also in order that grooves a painted out in black in FIG. 34 may serve the purpose of preventing flutter, the grooves a are made deeper or shallower than the other grooves, in the present embodiment, deeper, so that in the present embodiment, unnecessary outside-the-surface modes of three, five and six waves may be separated for seven-wave outside-the-surface mode driving.

Grooves b are grooves for preventing the division of the driving seven-wave mode by such flutter preventing grooves a, and differ in depth from the others of the plurality of grooves, in the present embodiment, have a medium depth relative to the others of the grooves a.

Figure 36:
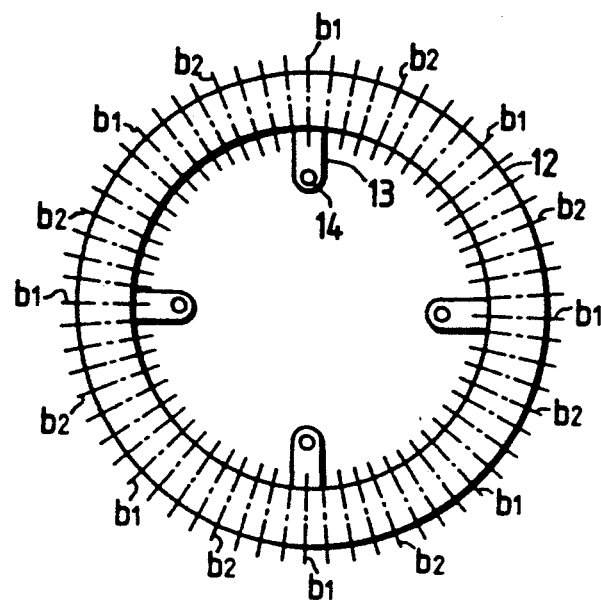
FIG. 36 is a plan view of another embodiment.

FIG. 36 is a plan view of a resilient member showing another embodiment of the present invention.

In this embodiment, as in the FIG. 34 embodiment described above, the other surface of the resilient member 12 is formed into a comb-tooth-like shape, and as a countermeasure for a case where the vibration mode for driving (four outside-the-surface waves) is divided by plate-like members 13 protruding to the inner periphery side of the resilient member 12 and each having a hole 14, among the grooves formed to improve the motor efficiency, grooves b1 and grooves b2 are distributed as shown in FIG. 37 to thereby make the divided modes coincident with each other.

Figure 37A:
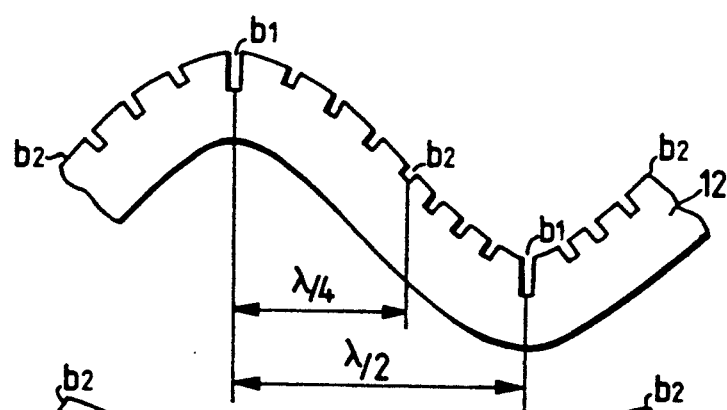
FIGS. 37A and 37B illustrate the principle of the FIG. 36 embodiment.
Figure 37B:
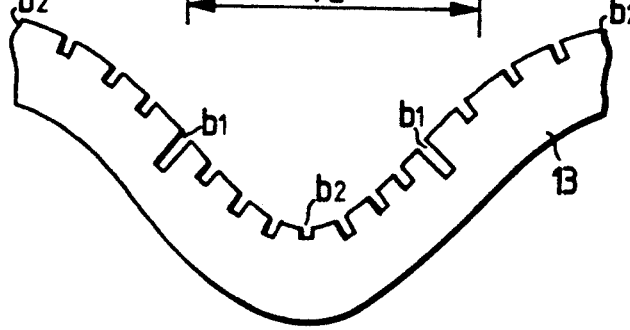

That is, assuming that the mode of higher natural frequency is Sin mode, as shown in FIG. 37A, the grooves b1 (in the present embodiment, $\frac{1}{4} \lambda$ pitch) located at the loop positions of Sin mode are made deeper than the other grooves to thereby reduce the dynamic rigidity in Sin mode. Thus, the natural frequency of Sin mode is reduced. At this time, with regard to Cos mode, the grooves b1 are at the node positions as shown in FIG. 37B and therefore, the influence of the grooves b1 upon the natural frequency is small.

On the other hand, the grooves b2 (in the present embodiment, $\frac{1}{4} \lambda$ pitch) located at the loop positions of Cos mode which is the mode of lower natural frequency are made shallower than the other grooves to thereby increase the dynamic rigidity in Cos mode. Thus, the natural frequency in Cos mode is increased.

The grooves b1 and the grooves b2 need not exist over the full periphery of the resilient member 12 at $\frac{1}{4} \lambda$ pitch as previously mentioned, but some of them may be omitted (the same depth as that of the other grooves) on the way if they only satisfy the condition that they should exist near the loops of each standing wave mode (within $\pm \lambda/8$ from the loops).

As hitherto described, according to the embodiments of FIGS. 25–37, by the presence of the member for fixing the resilient member and the holes or the like formed in said member, the difference in dynamic rigidity between the rectilinea portions and the arcuate portions which result from the elliptical shape of the resilient member, the prevention of flutter vibration, etc., the natural frequencies of the standing waves of the inherent standing wave mode for driving can be made coincident with each other even if the influence of the dynamic rigidity being partly non-uniform is imparted to the driving mode when the resilient member is partly non-uniform in dynamic rigidity, and the efficiency of a vibration wave motor in which, for example, the prevention of flutter vibration has been achieved can be improved.

Figure 38:
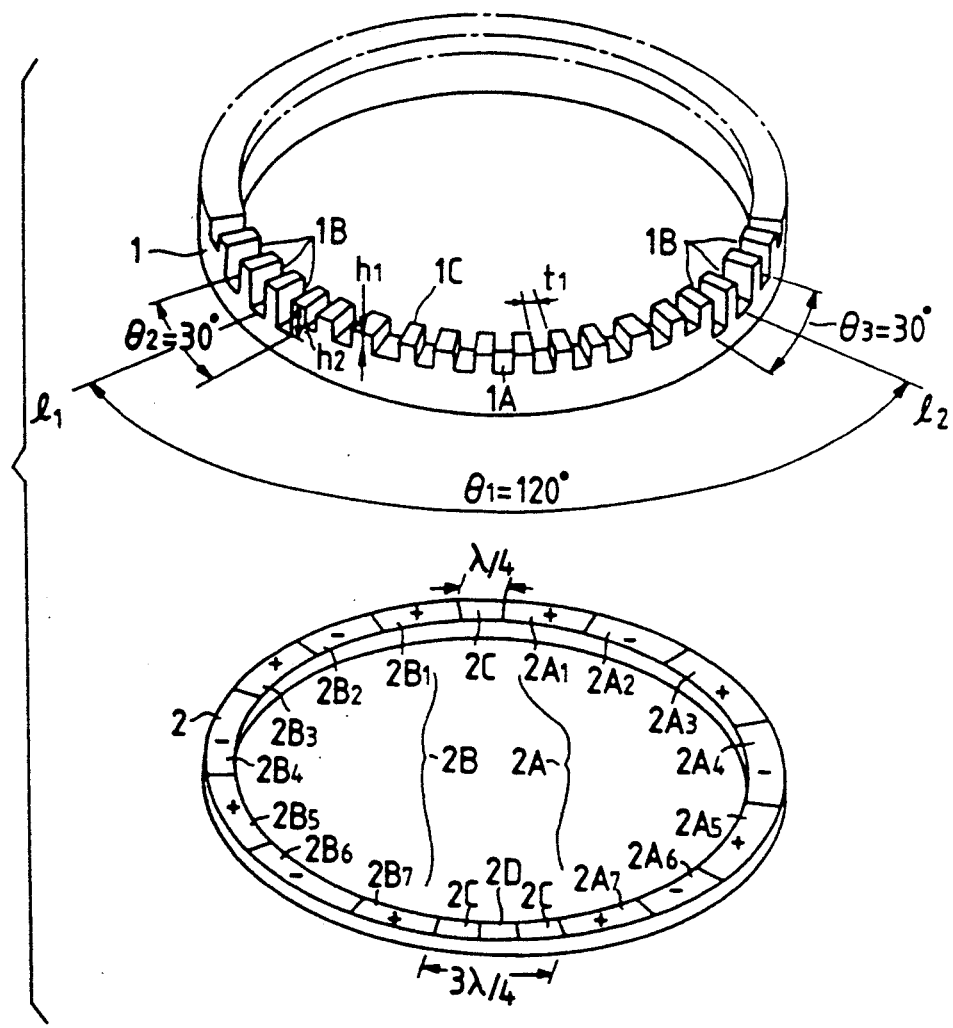
FIG. 38 is an exploded perspective view showing the essential portions of another vibration wave motor in a photo-taking lens for a single-lens reflex camera to which the present invention is applied.

FIG. 38 shows another embodiment in which the present invention is applied to construct a vibration wave motor as driving means for a photo-taking lens for a single-lens reflex camera, and more particularly shows an example of the construction of the resilient member 1 and the piezo-electric element 2 as the electromechanical energy conversion element of the vibration wave motor.

The construction of the photo-taking lens in which the vibration wave motor shown in FIG. 38 is used is substantially similar to that of the photo-taking lens shown in FIGS. 2 and 3 and therefore, in FIG. 38, only different elements are shown and the other elements need not be shown and described.

In FIG. 38, the reference numeral 1 designates a circular ring-like resilient member forming the essential constituent portion of the vibration wave motor. The resilient member 1 has a number of grooves 1A of width $t_1$ and depth $h_1$ formed on the surface of contact thereof with the rotor 3 (see FIG. 2) as a moving member over the full periphery thereof, and some of these grooves are formed as deep grooves of depth $h_2$ as shown as 1B.

A feature of the present embodiment lies in the relation of construction between the grooves of depth $h_1$ and the deep grooves of depth $h_2$, and this point will be described later in detail.

The reference numeral 2 denotes a piezo-electric element such as PZT as an electro-mechanical energy conversion element. This piezo-electric element 2 is adhesively secured to one end surface of the resilient member 1 (that end surface on which the grooves are not formed). The piezo-electric element 2 is polarized so that areas $2A_1$–$2A_7$ forming the A phase driving area and areas $2B_1$–$2B_7$ forming the B phase driving area may be alternately in different directions of polarization as shown in FIG. 38, and a common electrode 2C which is common to the A phase and B phase driving areas and connected to the earth of a drive source, not shown, is provided between the area $2A_1$ in the A phase driving area and the area $2B_1$ in the B phase driving area. Further, the circumferential lengths of the areas $2A_1$–$2A_7$ and $2B_1$–$2B_7$ forming the A phase and B phase driving areas, respectively, are set to ¼ of the wavelength λ of the flexural vibration of the resilient member 1, and the sum of the circumferential lengths of the common electrode 2C and sensor electrode 2D is set to the wavelength λ. Electrodes on the areas $2A_1$–$2A_7$ forming the A phase driving area which are provided on the side opposed to the common electrode 2C are connected to a first AC power source, not shown. Likewise, electrodes on the areas $2B_1$–$2B_7$ forming the B phase driving area are connected to a second AC power source, not shown, which outputs an AC signal having a phase difference of 90° with respect to the output signal of the first AC power source. Respective ones of the A phase driving areas $2A_1$–$2A_7$ and respective ones of the corresponding areas $2B_1$–$2B_7$ are spatially provided with a phase shift of λ/4 therebetween.

In addition to the above-described construction, the vibration wave motor of the present embodiment has a feature that the deep grooves 1B of depth $h_2$ are provided as follows.

Where the number of the waves of vibration which produces noise in the vibration wave motor is e.g. three (hereinafter, the flexural vibration when such number of waves are generated in the resilient member 1 will be referred to as the 3rd-order flexural vibration, and the flexural vibration when n waves are generated in the resilient member 1 will be referred to as the nth-order flexural vibration), the deep grooves 1B are provided over an area of 30° which is ¼ of the wavelength of the 3rd-order mode flexural vibration, about radial lines $l_1$ and $l_2$ spaced apart from each other by $\theta = 120°$ which is integer times as great as $\theta = 360°/2 \cdot 3$ (corresponding to ½ of the wavelength of the 3rd-order mode).

Accordingly, where the flexural vibration is of the nth-order mode, these deep grooves 1B are provided over an area of a length 360°/4n about positions having therebetween a spacing integer times as great as $\theta_1 = 360°/2n$.

The operation of the vibration wave motor having the above-described construction will now be described. When AC signals are supplied from the AC power sources to the A phase driving area and the B phase driving area of the piezo-electric element 2, a travelling vibration wave comprising eight waves, in other words, a travelling vibration wave of the 8th-order mode, is generated in the resilient member 1 by the flexural vibration of the piezo-electric element 2. The rotor 3 (see FIG. 2) is moved along the optic axis L by this vibration wave, whereby the focusing operation is executed, and this is similar to the case of the aforedescribed prior-art device.

The foregoing is the description of a case where the vibration wave motor operates normally.

However, when the nth-order mode flexural vibration which may produce noise from the start of the operation of this vibration wave motor, i.e., in the above-described example, the 3rd-order mode flexural vibration, is generated on the resilient member 1, the unnecessary vibration is suppressed in the present embodiment in the following manner.

The reason why as in the present embodiment, the portions of non-uniform resistance (the deep grooves) to the deformation of the resilient member are provided over the range of $(2k+1) \lambda/4$ [k being 0 or a positive integer] about the positions having therebetween a spacing integer times as great as ½ of the wavelength λ of the supposed unnecessary vibration is as follows.

Figure 39:
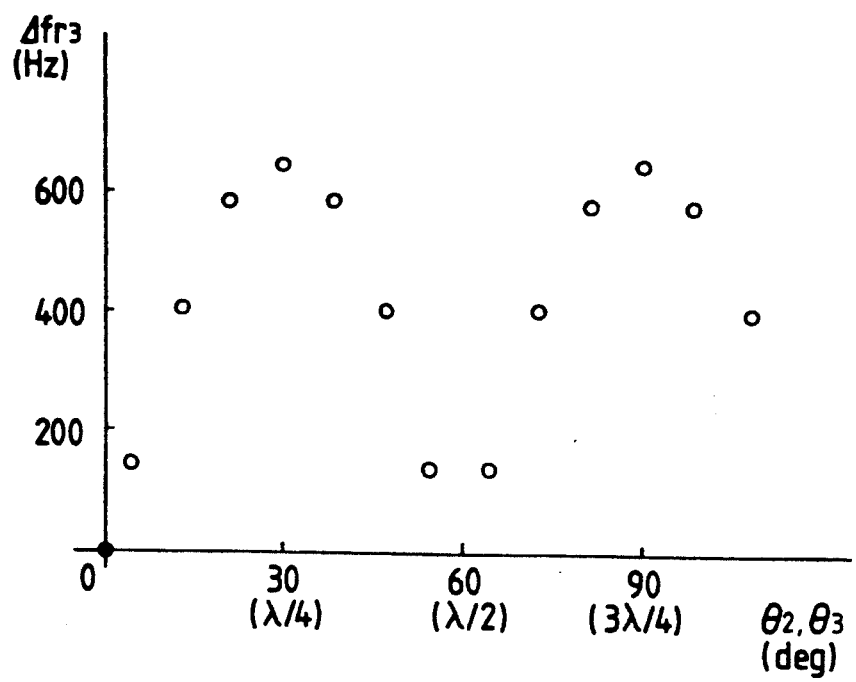
FIG. 39 is a graph showing the relation between the construction and the effect of the vibration wave motor of FIG. 38.

Describing now a case where the non-uniformity of the resistance to the deformation of the resilient member is provided by the depth of the grooves, how the difference $\Delta f_{r3}$ $(=f_{r31}-f_{r32})$ between the natural frequency $f_{r31}$ of the vibration member in the vibration wave of the unnecessary vibration mode having the center of the area in which the deep grooves are provided (the centers of which are $l_1$ and $l_2$) as the node (this is, for example, the 3rd-order mode vibration) and the natural frequency $f_{r32}$ of the resilient member in the 3rd-order mode vibration wave having $l_1$ and $l_2$ as the loops varies when the lengths $\theta_2$ and $\theta_3$ of the areas in which the deep grooves are provided are changed has been measured by actually testing a number of samples differing in $\theta_2$ and $\theta_3$, and the result is such as shown in FIG. 39.

From this result, it can be understood that the greater is $\Delta f_{r3}$, the more difficult it is for the 3rd-order mode vibration wave to become a travelling wave and accordingly the more difficult it is for noise to be produced. It is also seen that $\Delta f_{r3}$ is greatest when $\theta_2 = \theta_3 = (2k+1) \lambda/4 = 30° \cdot (2k+1)$ [k being 0 or a positive integer] and that when $\theta_2$ and $\theta_3$ are integer times as great as $360°/2 \cdot 3$, $\Delta f_{r3}$ approximates 0.

That is, this is considered to be attributable to the fact that by providing the deep grooves in the manner described above, the dynamic rigidity of the 3rd-order mode having $l_1$ and $l_2$ as the loops is decreased and the natural frequency of this mode is decreased, but when $\theta_2 = \theta_3$ is made equal to the vicinity of 60°, not only the dynamic rigidity of the 3rd-order mode having $l_1$ and $l_2$ as the loops is decreased, but also the dynamic rigidity of the 3rd-order mode having $l_1$ and $l_2$ as the nodes is decreased at the same time and therefore $\Delta f_{r3}$ becomes smallest for integer times $360°/2 \cdot 3$.

From that has been described just above, it is confirmed that in the vibration wave motor of the above-described construction, when there is noise producing vibration of the 3rd-order mode, the deep grooves are provided at an interval integer times as great as ½ of the wavelength λ and moreover in the length range θ of the area in which the deep grooves are formed, there is a periodicity having 60° (λ/2) as a period. Accordingly, it can be confirmed that assuming that the wavelength of the nth-order mode vibration which is unnecessary vibration which may produce noise is λ, when portions of non-uniform resistance to the deformation of the resilient member are provided at said predetermined interval, the length of the area of the portions of non-uniform resistance is made equal to $(2k+1) \lambda/4$ [k being 0 or a positive integer] to thereby achieve the greatest effect for preventing noise.

In a vibration wave motor thus constructed so that the resistance to flexure becomes non-uniform in a predetermined positional relation with respect to the circumferential direction, as described above, the natural frequency of the vibration member 1 in the 3rd-order mode vibration wave having as the nodes $l_1$ and $l_2$ which are the centers of the areas in which the deep grooves 1B are provided is high, while the natural frequency of the resilient member 1 in the 3rd-order mode vibration wave having the locations of the deep grooves 1B as the loops is lower than the aforementioned natural frequency. Thus, the natural frequencies of the resilient member 1 at the respective positions of the 3rd-order mode vibration waves differ from each other and therefore, the 3rd-order mode vibration wave which may produce noise cannot become a travelling wave and accordingly, even if the 3rd-order mode vibration wave is generated due to some cause or other, the production of noise thereby is suppressed in the present embodiment.

In contrast, in the vibration wave motor of the conventional type shown in FIG. 3, the vibration member does not have the structure of non-uniformity with respect to the circumferential direction which precludes the generation of the 3rd-order mode travelling wave and therefore, the 3rd-order mode travelling wave is generated, thus resulting in the production of noise.

In the embodiment of FIG. 38, the deep grooves 1B which make the dynamic rigidity of the resilient member 1 partly non-uniform are provided in two areas about a predetermined location on the resilient member 1, i.e., a location corresponding to integer times ½ of the wavelength λ of the 3rd-order mode vibration wave which may produce noise (hereinafter referred to as γλ/2, γ being an integer), whereas the areas in which these deep grooves are provided are not limited to two.

Also, in the above described embodiment, deep grooves are provided as a construction for making the dynamic rigidity partly non-uniform, but alternatively, these grooves may be made shallow to thereby provide partial non-uniformity.

Further, in the above-described embodiment, the non-uniform areas are provided about the location on the resilient member which corresponds to γλ/2 of the wavelength λ of the vibration wave which may produce noise, but alternatively, the resilient member itself may be made uniform and cut-aways, holes or the like may be formed in the above-described areas about the above-mentioned predetermined location on the circular ring-like vibration insulating member 4 shown in FIG. 2 to thereby provide the non-uniformity of the resistance to the flexure of the resilient member, or a similar countermeasure may be taken for the vibration absorbing member 5 and the output transmitting member 25 shown in FIG. 2. Saying in addition, at a predetermined location on a constituent of the vibration wave motor or a constituent of a device connected to the motor, structure which is non-uniform over said predetermined location and predetermined area can be provided to thereby realize the objects of the present invention.

The above-described location at which is provided the structure portion for providing the non-uniformity of the resistance to the flexure of the resilient member and the area thereof are not strictly limited to the portions limited by the above-mentioned mathematical expression, but such structure portion may be provided substantially at the same location or the same area, and this also holds true of the following embodiments.

Figure 40:
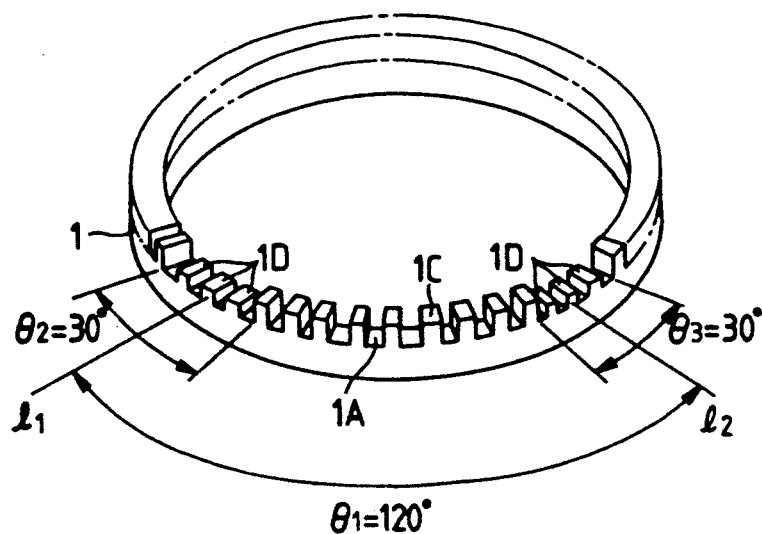
FIGS. 40–43 show further embodiments of the vibration wave motor to which the present invention is applied.

FIG. 40 shows another embodiment of the present invention, and the feature of this embodiment is that the teeth 1C at the locations $l_1$ and $l_2$ described in connection with FIG. 38 are formed as teeth 1D of small height.

Such a construction can also provide the non-uniformity of the internal resistance of the resilient member which is similar to that in the embodiment of FIG. 38 and can therefore obtain an effect similar to that of the FIG. 38 embodiment.

Figure 41:
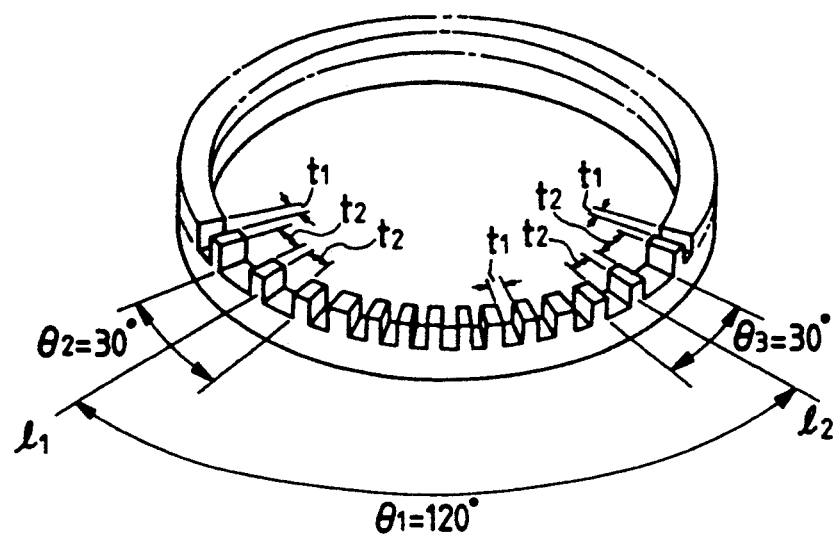

FIG. 41 shows still another embodiments of the present invention, and the feature of this embodiment is that the grooves 1A of width $t_1$ at the locations $l_1$ and $l_2$ described in connection with FIG. 38 are provided as grooves 1E of different width $t_2$. Such a construction can also obtain an effect similar to that of the FIG. 38 embodiment. Further, a smaller width of the grooves, discretely from a greater width of the grooves, can also lead to the obtainment of a similar effect.

Figure 42:
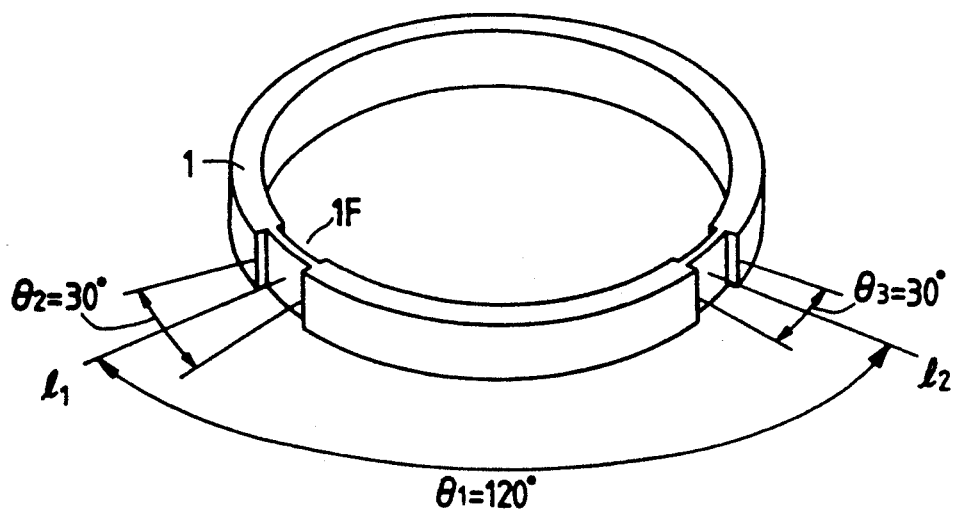

FIG. 42 shows an embodiment in which at the above-mentioned predetermined locations on the resilient member, the widthwise dimention of the resilient member itself is changed also over a predetermined area to thereby provide the same non-uniformity of the resistance to the flexure of the resilient member as that described above. In the construction shown in this figure, grooves 1F are formed in the inner and outer sides of the resilient member 1, but alternatively, such grooves 1F may be formed in one of the inner side and the outer side. Also, the material of the same portion of the resilient member can be made different from the material of the other portion to thereby obtain a similar effect.

Figure 43:
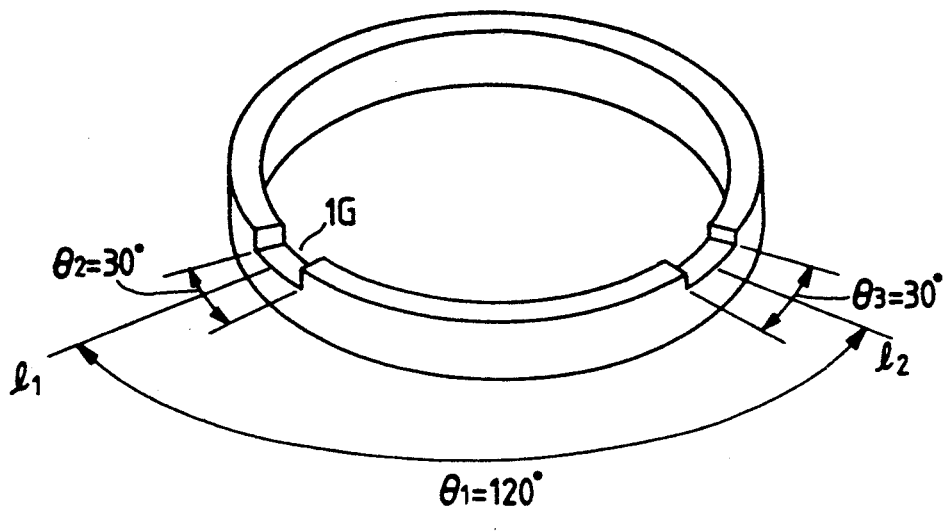

FIG. 43 shows an embodiment in which at the above-mentioned predetermined locations on the resilient member, the height of the resilient member itself is changed over a predetermined area to thereby provide the same non-uniformity of the resistance to the flexure of the resilient member as that described above. Conversely, the height of the same portions of the resilient member may be made greater than the height of the other portion, or such cut-aways may be formed in the lower surface of the resilient member.

While the constructions shown in FIGS. 40 to 43 have been described as being provided in the resilient member itself, such a construction may of course be provided not in the resilient member but in other member operatively connected thereto, for example, the rotor, the output transmitting member or the like, as described above in connection with the FIG. 38 embodiment.

Figure 44:
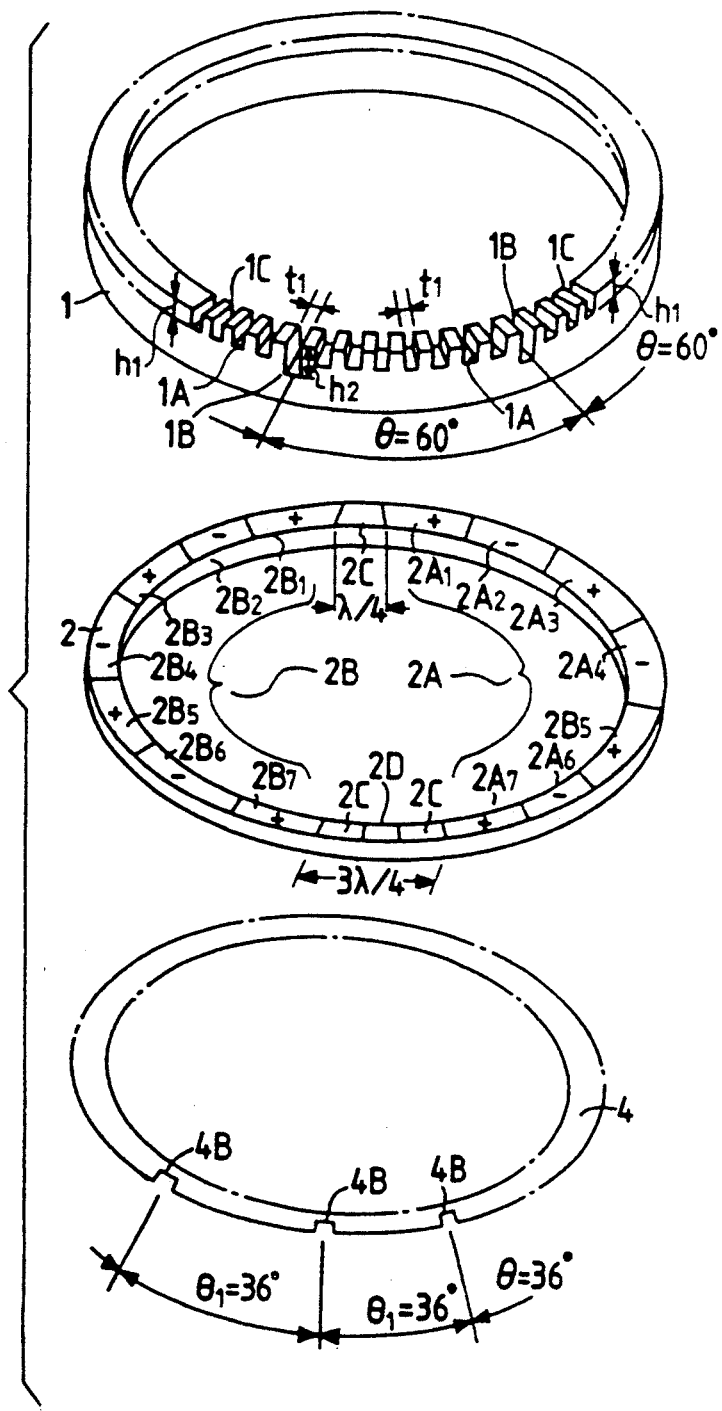
FIG. 44 is an exploded perspective view of the essential portions of a vibration wave motor in a photo-taking lens for a single-lens reflex camera to which the present invention is applied.

FIG. 44 is a perspective view of the essential portions of the resilient member 1 and the piezo-electric element 2 as the electro-mechanical energy conversion element of a vibration wave motor in a photo-taking lens for a single-lens reflex camera to which the present invention is applied. The photo-taking lens shown in FIG. 44 is substantially the same as the photo-taking lens shown in FIGS. 2 and 3 and therefore, only elements differing from those of the photo-taking lens shown in FIG. 2 will be described and the other elements need not be described.

In FIG. 44, the reference numeral 1 designates a circular ring-like resilient member forming the main constituent portion of a vibration wave motor, and in the surface of contact thereof with the rotor 3 (see FIG. 2) as a moving member, a number of grooves 1A of width $t_1$ and depth $h_1$ are formed over the full periphery thereof. Some of these grooves are deep grooves of depth $h_2$ as shown as 1B. When the number of the waves of a vibration wave which produces noise is e.g. three (hereinafter, the flexural vibration wave when this number of waves are generated in the resilient member 1 will be referred to as the 3rd-order mode flexural vibration wave and the flexural vibration wave when n waves are generated in the resilient member 1 will be referred to as the nth-order mode flexural vibration wave), six such deep grooves 1B are provided at an interval of pitch $\theta = 60°$ or an interval approximate thereto (in the latter case, noise is suppressed to such a degree that there is no problem in practical use).

The reference numeral 4 denotes a circular ring-like vibration insulating member provided on the back of the piezo-electric element 2 for absorbing the vertical vibration of the vibration member 1. The vibration insulating member 4 is formed with a plurality of cut-aways 4B on the circumference thereof. Since these cut-aways 4B are cut-aways for preventing noise from being produced by the 5th-order mode flexural vibration wave, the pitch $\theta_1$ of the cut-aways 4B is an interval of $\theta_1 = 36°$ or an interval approximate thereto (in this case, noise is suppressed to such a degree that there is no problem in practical use).

When flexural vibration waves which produce noise are the $n_1$th-order mode and $n_2$th-order mode flexural vibration waves, the deep grooves 1B are provided on the resilient member 1 at an interval of $$\theta = \frac{360°}{2n_1}$$

or an interval substantially approximate thereto and the cut-aways 4B are provided on the resilient member 1 and the insulating member 4 at an interval of $$\theta_1 = \frac{360°}{2n_2}$$

or an interval substantially approximate thereto. The reference numeral 2 denotes a piezo-electric element such as PZT as an electro-mechanical energy conversion element. As in the prior-art device shown in FIG. 2, the piezo-electric element 2 is attached to one end surface of the resilient member 1 by an adhesive agent. Areas $2A_1$-$2A_7$ forming the A phase driving area of the piezo-electric element 2 and areas $2B_1$-$2B_7$ forming the B phase driving area of the piezo-electric element 2 are alternately polarized in different directions of polarization as shown in FIG. 44, and a common electrode 2C which is common to the A phase and B phase driving areas and connected to the earth of a drive source, not shown, is provided between the area $2A_1$ in the A phase driving area and the area $2B_1$ in the B phase driving area.

The width of the areas $2A_1$-$2A_7$ and $2B_1$-$2B_7$ forming the A phase and B phase driving areas is set to $\frac{1}{2}$ of the wavelength $\lambda$ of the flexural vibration wave of the resilient member 1 and further, the sum of the widths of the common electrode 2C and sensor electrode 2D is set to the wavelength $\lambda$. Electrodes on the areas $2A_1$-$2A_7$ forming the A phase driving area which are provided on the side opposed to the common electrode 2C are connected to a first AC power source, not shown. Also, electrodes on the areas $2B_1$-$2B_7$ forming the B phase driving area which are provided on the side opposed to the common electrode 2C are connected to a second AC power source, not shown, which outputs an AC signal having a phase difference of 90° with respect to the output signal of the first AC power source. Respective ones of the A phase driving areas $2A_1$-$2A_7$ and respective ones of the B phase driving areas $2B_1$-$2B_7$ corresponding to respective ones of the areas $2A_1$-$2A_7$ are spaced apart from one another by $\lambda/4$.

The operation of the photo-taking lens of such construction will now be described.

When AC signals are supplied from the first and second AC power sources to the A phase driving area and the B phase driving area of the piezo-electric element 2, a travelling vibration wave comprising eight waves, in other words, an 8th-order mode travelling vibration wave, is generated in the resilient member 1 by the flexural vibration of the piezo-electric element 2, and the rotor 3 (see FIG. 2) is rotated about the optic axis L by this vibration wave. As a result, the focusing lens 27 is moved along the optic axis L, whereby the focusing operation is executed.

The above description is the description of the operation when the vibration wave motor operates normally, and description will hereinafter be made of the operation when the $n_1$th-order mode and $n_2$th-order mode flexural vibration waves which may produce noise during the operation or from the start of the operation, for example, the 3rd-order mode and 5th-order mode flexural vibration waves, are generated on the resilient member 1.

In the case of the resilient member 1 of non-uniform dynamic rigidity as shown in FIG. 44, the natural frequency $f_1$ of the resilient member 1 corresponding to the 3rd-order mode vibration wave having the locations of the deep grooves 1B as modes is high, while the natural frequency $f_2$ of the resilient member 1 corresponding to the 3rd-order mode vibration wave having the locations of the deep grooves 1B as loops is lower than the natural frequency $f_1$.

Thus, the natural frequencies of the resilient member 1 at the respective locations of the 3rd-order mode vibration waves differ from each other and therefore, the 3rd-order mode vibration wave which may produce noise cannot become a travelling wave and accordingly, even if the 3rd-order mode vibration wave is generated due to some cause or other, noise will not be produced thereby.

Also, the natural frequency $f_3$ of the resilient member 1 corresponding to the 5th-order mode vibration wave having the locations of the cut-aways 4B as modes is high, while the natural frequency $f_4$ of the resilient member 1 corresponding to the 5th-order mode vibration wave having the locations of the cut-aways 4B as loops is lower than the natural frequency $f_3$.

Thus, the natural frequencies of the resilient member 1 at the respective locations of the 3rd-order and 5th-order mode vibration waves differ from each other and therefore, the 3rd-order and 5th-order mode vibration waves which may produce noise can neither become a travelling wave and accordingly, even if the 3rd-order and 5th-order mode vibration waves are generated due to some cause or other, noise will not be produced thereby.

In the embodiment shown in FIG. 44, the deep grooves 1B and cut-aways 4B for making the dynamic rigidity of the resilient member 1 partly non-uniform are provided at predetermined locations on the resilient member 1 and insulating member 4, i.e., locations corresponding to integer times $\frac{1}{2}$ of the wavelengths $\lambda_1$ and $\lambda_2$ of the 3rd-order mode and 5th-order mode vibration waves which may produce noise (hereinafter written as $$\frac{\gamma\lambda_1}{2} \text{ and } \frac{\gamma\lambda_2}{2},$$

γ being an integer), but if conversely, the grooves and cut-aways at the locations of the deep grooves 1B and cut-aways 4B are made shallow to thereby make the dynamic rigidity of the resilient member 1 partly non-uniform, there will be obtained an effect similar to that previously described.

A measure similar to the measure taken for the insulating member 4 shown in FIG. 44 may be taken for the output transmitting member 25 shown in FIG. 2. Saying in addition, the non-uniform portions as previously described may be provided at predetermined locations on a constituent of the vibration wave motor or a constituent of a device connected to the motor, i.e., locations corresponding to $$\frac{\gamma\lambda_1}{2}, \frac{\gamma\lambda_2}{2} \text{ and } \frac{\gamma\lambda_n}{2}$$

of the wavelengths $\lambda_1$, $\lambda_2$ and $\lambda_n$ of vibration waves which may produce noise, whereby noise can be prevented.

Figure 45:
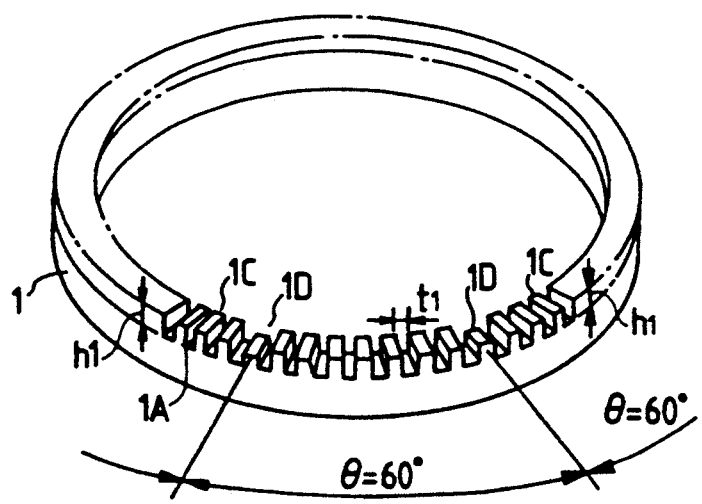
FIG. 45 is a perspective view of the essential portions of another embodiment of the vibration wave motor to which the present invention is applied.

FIG. 45 shows another embodiment of the resilient member 1 shown in FIG. 44. This embodiment is one in which some of the teeth 1C shown in the embodiment of FIG. 44, i.e., some of the teeth 1C provided at locations corresponding to $$\frac{\gamma\lambda}{2}$$

of the wavelength λ of the 3rd-order mode vibration wave which may produce noise, are planed to form teeth 1D of smaller height, thereby making the dynamic rigidity of the resilient member 1 partly non-uniform.

The above embodiments have been shown as circular ring-like vibration wave motors, whereas the present invention can be applied not only to such vibration wave motors, but also to a vibration wave motor in which the resilient member is of a disk-like shape or an elliptical shape, as well as to a vibration wave motor of the type in which the resilient member 1 itself is moved by a travelling vibration wave.

We claim:

1. A vibration wave driven device, comprising:
   a vibration member;
   an electro-mechanical energy conversion member provided on said vibration member for generating a travelling vibration wave in the vibration member in response to an applied electrical signal, whereby the travelling vibration wave has a first wavelength and creates a relative movement between the vibration member and a contact member in frictional contact with the vibration member; and
   vibration damping means for making a dynamic rigidity of a predetermine done of said vibration member and said contact member non-uniform with respect to a second vibration wave having a wavelength other than said first wavelength, the vibration damping means being located at a portion of the predetermined member substantially corresponding to integer times ½ of the wavelength of the second vibration wave and substantially not corresponding to integer times ½ of the first wavelength of the travelling vibration wave.

2. A vibration wave driven device according to claim 1, wherein said vibration damping means includes a plurality of vibration damping elements located at portions of said predetermined member corresponding to integer times or approximately integer times ½ of the wavelength of said second vibration wave.

3. A vibration wave driven device according to claim 2, wherein said vibration damping elements are provided on said vibration member.

4. A vibration wave driven device according to claim 3, wherein said vibration member includes a plurality of projections defined by a plurality of grooves formed therein, for amplifying the amplitude of said travelling vibration wave.

5. A vibration wave driven device according to claim 4, wherein the other vibration damping means includes selected ones of said grooves, the selected grooves having a depth greater than said grooves forming the amplitude amplifying projections.

6. A vibration wave driven device according to claim 4, wherein said vibration damping means includes selected ones of said projections, the selected projections having a height less than the height of the other amplitude amplifying projections.

7. A vibration wave driven device according to claim 4, wherein said vibration damping means includes selected ones of said grooves, the selected grooves having a width greater than the width of the other grooves forming the amplitude amplifying projections.

8. A vibration wave driven device according to claim 3, wherein said vibration damping means comprises a plurality of grooves having a predetermined width and formed in the contact surface side of said vibration member.

9. A vibration wave driven device according to claim 4, wherein said vibration damping means is formed by selected ones of said projections, the selected projections having a width greater than the width of the other amplitude amplifying projections.

10. A vibration wave driven device according to claim 2, wherein said vibration damping means is provided on a vibration absorbing member for absorbing a vertical-direction vibration normal to a travelling direction of said travelling vibration wave.

11. A vibration driven motor, comprising:
    a vibration member;
    an electro-mechanical energy conversion member coupled to said vibration member for generating a selected driving vibration in the vibration member in response to a periodic signal applied thereto, whereby the driving vibration creates relative movement between the vibration member and a contact member in frictional contact with the vibration member; and
    vibration damping means for making a dynamic rigidity of a predetermined one of said vibration member and said contact member non-uniform with respect to a vibration other than said selected driving vibration, the vibration damping means being located at a portion of the predetermined member substantially corresponding to integer times ½ of the wavelength of said vibration other than the selected driving vibration and substantially not corresponding to integer times ½ of the wavelength of the driving vibration.

12. A vibration driven motor according to claim 11, wherein said vibration damping means includes a plurality of vibration damping elements located at portions of said predetermined member corresponding to integer times or approximately integer times ½ of the wavelength of said vibration other than the selected driving vibration.

13. A vibration driven motor according to claim 12, wherein said vibration damping elements are provided on said vibration member.

14. A vibration wave driven device, comprising:
a vibration member;
an electro-mechanical energy conversion member provided on said vibration member for generating a travelling vibration wave in the vibration member in response to an applied electrical signal, whereby the travelling vibration wave has a first wavelength and creates relative movement between the vibration member and a contact member in frictional contact with the vibration member; and
vibration damping means for making the dynamic rigidity of a predetermined one of said vibration member and said contact member irregular with respect to a second vibration wave having a wavelength other than said first wavelength, the vibration damping means being located at a portion of the predetermined member substantially corresponding to integer times ½ of the wavelength of the second vibration wave and substantially not corresponding to integer times ½ of the first wavelength of the travelling vibration wave.

15. A vibration wave driven device according to claim 14, wherein said vibration damping means includes a plurality of vibration damping elements located at portions of said predetermined member corresponding to integer times or approximately integer times ½ of the wavelength of said second vibration.

16. A vibration driven motor, comprising:
a vibration member;
an electro-mechanical energy conversion member coupled to said vibration member for generating a selected driving vibration in the vibration member in response to a periodic signal applied thereto, whereby the driving vibration creates relative movement between the vibration member and a contact member in frictional contact with the vibration member; and
vibration damping means for making a dynamic rigidity of a predetermined one of said vibration member and said contact member irregular with respect to a vibration other than said driving vibration, the vibration damping means being located at a portion of the predetermined member substantially corresponding to integer times ½ of the wavelength of the second vibration wave and substantially not corresponding to integer times ½ of the first wavelength of the travelling vibration wave.

17. A vibration driven motor according to claim 16, wherein said vibration damping means includes a plurality of vibration damping elements located at portions of said predetermined member corresponding to integer times or approximately integer times ½ of the wavelength of said vibration other than the selected driving vibration.

18. A vibration wave driven device, comprising:
a vibration member;
an electro-mechanical energy conversion member having first and second elements which are located with a spatial phase difference on said vibration member, said first element generating a first standing wave in said vibration member in response to a first electrical signal applied thereto, said second element generating a second standing wave in said vibration member in response to a second electrical signal having a phase difference with said first electrical signal, a combined vibration wave of said first and second standing vibrations having a first wavelength and causing relative movement between said vibration member and a contact member in frictional contact with said vibration member; and
vibration damping means for making a dynamic rigidity of a predetermined one of said vibration member and said contact member non-uniform with respect to a second vibration wave having a wavelength other than said first wavelength, the vibration damping means being located at a portion of the predetermined member substantially corresponding to integer times ½ of the wavelength of the second vibration wave and substantially not corresponding to integer times ½ of the first wavelength of the travelling vibration wave.

19. A vibration wave driven device according to claim 18, wherein said vibration damping means includes a plurality of vibration damping elements located at portions of said vibration member corresponding to integer times or approximately integer times ½ of the wavelength of said second vibration wave.

20. A vibration wave driven system, comprising:
a vibration member;
a contact member provided in frictional contact with said vibration member;
an electro-mechanical energy conversion member having first and second elements located with a spatial phase difference therebetween, said first element generating a first standing wave in said vibration member in response to a first electrical signal applied thereto, said second element generating a second standing wave in said vibration member in response to a second electrical signal having a phase difference with said first electrical signal, a combined vibration wave of said first and second standing vibrations having a first wavelength and causing relative movement between the vibration member and the contact member;
vibration damping means for making a dynamic rigidity of a predetermined one of said vibration member and said contact member non-uniform with respect to a second vibration wave having a wavelength other than said first wavelength, the vibration damping means being located at a portion of the predetermined member substantially corresponding to integer times ½ of the wavelength of the second vibration wave and substantially not corresponding to integer times ½ of the first wavelength of the travelling vibration wave; and
a load member to be driven by said contact member.

21. A vibration wave driven system according to claim 20, wherein said load member includes a lens for a camera.

22. A vibration wave driven system, comprising:
a vibration member;
a contact member provided in frictional contact with said vibration member;

an electro-mechanical energy conversion member having first and second elements which are located with a spatial phase difference therebetween on said vibration member, said first element generating a first standing wave in said vibration member in response to a first electrical signal applied thereto, said second element generating a second standing wave in said vibration member in response to a second electrical signal having a phase difference with said first electrical signal, a combined vibration wave of said first and second standing vibrations having a first wavelength and causing relative movement between said vibration member and said contact member;

vibration damping means for making a dynamic rigidity of a predetermined one of said vibration member and said contact member irregular with respect to a second vibration wave having a wavelength other than said first wavelength, the vibration damping means being located at a portion of the predetermined member substantially corresponding to integer times ½ of the wavelength of the second vibration wave and substantially not corresponding to integer times ½ of the first wavelength of the travelling vibration wave; and a load member to be driven by said contact member.

23. A vibration wave driven device, comprising:

a vibration member for generating a travelling wave having a first wavelength therein in response to an applied electrical signal, whereby the travelling wave creates relative movement between the vibration member and a contact member in frictional contact with the vibration member; and vibration damping means for making a dynamic rigidity of a predetermined one of said vibration member and said contact member non-uniform with respect to a second vibration wave having a wavelength other than said first wavelength, the vibration damping means being located at a portion of the predetermined member substantially corresponding to integer times ½ of the wavelength of the second vibration wave and substantially not corresponding to integer times ½ of the first wavelength of the travelling vibration wave.

24. A vibration wave driven device, comprising:

a vibration member for generating a travelling wave having a first wavelength therein in response to an applied electrical signal, whereby the travelling wave creates relative movement between the vibration member and a contact member in frictional contact with the vibration member; and vibration damping means for making a dynamic rigidity of a predetermined one of said vibration member and said contact member non-uniform with respect to a second vibration wave having a wavelength other than said first wavelength, the vibration damping means being located at a portion of the predetermined member and substantially not corresponding to integer times ½ of the first wavelength of the travelling vibration wave.

25. A vibration wave driven device, comprising:

a vibration member for generating a travelling wave having a first wavelength therein in response to an applied electrical signal, whereby the travelling wave creates relative movement between the vibration member and a contact member in frictional contact with the vibration member; and vibration damping means for making a dynamic rigidity of a predetermined one of said vibration member and said contact member non-uniform with respect to a second vibration wave having a wavelength other than said first wavelength, the vibration damping means being located at a portion of the predetermined member substantially corresponding to integer times ½ of the wavelength of the second vibration wave.

* * * * *

UNITED STATES PATENT AND TRADEMARK OFFICE
CERTIFICATE OF CORRECTION

PATENT NO. : 5,300,850

DATED : April 5, 1994

INVENTOR(S) : OKUMURA, ET AL.

It is certified that error appears in the above-indentified patent and that said Letters Patent is hereby corrected as shown below:

Column 11

Line 11, change "Thus" to --Thus,--.

Column 15

Line 13, change "In Fig. 19C," to --Fig. 19C--
Line 41, change "Hereinafter" to --Hereinafter,--.

Column 18

Line 62, change "$\oplus + \ominus$ and $\oplus - \ominus$" to --$\oplus$ and $\ominus$--.

Column 19

Line 59, change "wave," to --wave),--.

Column 21

Line 2, delete "generates a standing wave of elements".
Line 38, change "seven" to --seven,--.

Column 22

Line 46, change "(are" to --$\ell$ are--.

Column 24

Line 22, change "rectilinea" to --rectilinear--.

UNITED STATES PATENT AND TRADEMARK OFFICE
CERTIFICATE OF CORRECTION

PATENT NO. : 5,300,850
DATED : April 5, 1994
INVENTOR(S) : OKUMURA, ET AL.

It is certified that error appears in the above-indentified patent and that said Letters Patent is hereby corrected as shown below:

<u>Column 26</u>

Line 4, change "being O" to --being 0-- (zero).
    Line 29, change "being O" to --being 0-- (zero).
    Line 31, change "O." to --0-- (zero).
    Line 58, change "O" to --0-- (zero).

<u>Column 28</u>

Line 4, change "embodiments" to --embodiment--
    Line 15, change "dimention" to --dimension--.

<u>Column 31</u>

Line 61, change "done" to --one--

<u>Column 32</u>

Line 18, change "the other" to --said--.
    Line 20, change "said" to --the other--.

Signed and Sealed this

Eleventh Day of October, 1994

*Attest:*

BRUCE LEHMAN

*Attesting Officer*     Commissioner of Patents and Trademarks